United States Patent
Yim et al.

(10) Patent No.: US 9,436,384 B2
(45) Date of Patent: Sep. 6, 2016

(54) MOBILE TERMINAL AND METHOD OF CONTROLLING THE SAME

(71) Applicant: LG ELECTRONICS INC., Seoul (KR)

(72) Inventors: Soyeon Yim, Seoul (KR); Jisun Lee, Seoul (KR); Eugene Myung, Seoul (KR); Jungbin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/561,269

(22) Filed: Dec. 5, 2014

(65) Prior Publication Data

US 2016/0011768 A1 Jan. 14, 2016

(30) Foreign Application Priority Data

Jul. 9, 2014 (KR) .................. 10-2014-0086207

(51) Int. Cl.
| | |
|---|---|
| *G06F 3/041* | (2006.01) |
| *G06F 3/0488* | (2013.01) |
| *H04M 1/27* | (2006.01) |
| *H04M 1/725* | (2006.01) |
| *H04M 1/67* | (2006.01) |

(52) U.S. Cl.
CPC .......... *G06F 3/04883* (2013.01); *H04M 1/271* (2013.01); *H04M 1/72519* (2013.01); *H04M 1/67* (2013.01); *H04M 1/72522* (2013.01); *H04M 2250/22* (2013.01); *H04M 2250/74* (2013.01)

(58) Field of Classification Search
CPC .. G06F 3/041; G06F 3/0481; G06F 3/04845; G06F 3/0488; G06F 2200/1636; G06F 2203/0381; G06F 2203/04101; G06F 2203/04104; G06F 2207/025; H04M 1/271; H04W 52/0254; H04W 52/0267
See application file for complete search history.

(56) References Cited

U.S. PATENT DOCUMENTS

| | | | | |
|---|---|---|---|---|
| 8,816,985 | B1* | 8/2014 | Tate | G06F 3/041 345/173 |
| 2009/0146962 | A1 | 6/2009 | Ahonen et al. | |
| 2009/0271486 | A1* | 10/2009 | Ligh | G06F 3/04886 709/206 |
| 2010/0088596 | A1 | 4/2010 | Griffin et al. | |
| 2012/0306927 | A1* | 12/2012 | Lee | G06F 3/041 345/660 |
| 2013/0290761 | A1* | 10/2013 | Moon | G06F 1/3215 713/323 |
| 2013/0332354 | A1* | 12/2013 | Rhee | G06Q 20/085 705/41 |
| 2014/0143859 | A1* | 5/2014 | Linge | G06F 21/36 726/19 |
| 2014/0156269 | A1* | 6/2014 | Lee | G06F 1/3206 704/231 |
| 2015/0135080 | A1* | 5/2015 | Ji | G06F 3/0416 715/728 |
| 2015/0234586 | A1* | 8/2015 | Lee | G06F 3/04883 715/800 |
| 2015/0373393 | A1* | 12/2015 | Lee | H04N 21/42203 704/275 |
| 2016/0014264 | A1* | 1/2016 | Yim | H04M 1/72577 455/411 |

FOREIGN PATENT DOCUMENTS

| | | |
|---|---|---|
| EP | 2674834 A2 | 12/2013 |
| KR | 10-2014-0074651 A | 6/2014 |
| KR | 10-1404234 B1 | 6/2014 |

* cited by examiner

*Primary Examiner* — Joe H Cheng
(74) *Attorney, Agent, or Firm* — Birch, Stewart, Kolasch & Birch, LLP

(57) ABSTRACT

A mobile terminal including a wireless communication unit configured to provide wireless communication; a display unit; a sensing unit configured to sense a plurality of taps applied to the display unit; and a controller configured to control the display unit to be in a deactivated state, receive a plurality of taps applied to the display unit in the deactivated state, and execute a voice recognition function while maintaining the display unit in the deactivated state, when a pattern formed by the plurality of taps matches a preset pattern.

18 Claims, 25 Drawing Sheets

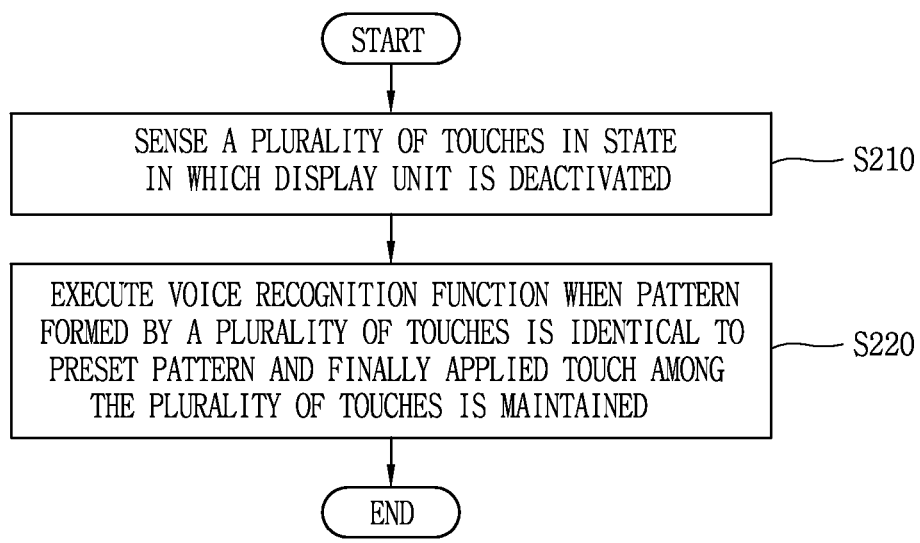

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Applications No. 10-2014-0086207 filed on Jul. 9, 2014, the contents of which is incorporated by reference herein in its entirety.

BACKGROUND OF THE INVENTION

1. Field of the Invention

The present invention relates to a mobile terminal and corresponding method for sensing a tap applied to a display unit in a deactivated state.

2. Background of the Invention

Terminals may be generally classified as mobile/portable terminals or stationary terminals. Mobile terminals may also be classified as handheld terminals or vehicle mounted. Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing or multimedia player function. In particular, more recently, mobile terminals have been configured to receive broadcast and multicast signals which permit viewing of content such as videos and television programs.

In addition, with the increased complexity of the functions, a more complex user interface is provided. The complex user interface is sometimes inconvenient and difficult to use for the user.

SUMMARY OF THE INVENTION

Accordingly, one aspect of the detailed description is to address the above-noted and other problems with the related art.

Another aspect of the detailed description is to provide a mobile terminal and corresponding method for controlling the terminal based on an applied tap on a deactivated display unit.

Another aspect of the detailed description is to provide a mobile terminal and corresponding method for executing a voice recognition function by using taps applied to a deactivated display unit, while maintaining the display unit in a deactivated state.

To achieve these and other advantages and in accordance with the purpose of this specification, as embodied and broadly described herein, the present invention provides in one aspect a mobile terminal including a wireless communication unit configured to provide wireless communication; a display unit; a sensing unit configured to sense a plurality of taps applied to the display unit; and a controller configured to control the display unit to be in a deactivated state, receive a plurality of taps applied to the display unit in the deactivated state, and execute a voice recognition function while maintaining the display unit in the deactivated state, when a pattern formed by the plurality of taps matches a preset pattern. The present invention also provides a corresponding method of controlling the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 2 is a flow chart illustrating a method for executing a voice recognition function based on a control command applied to a display unit, while the display unit is maintained in a deactivated state.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
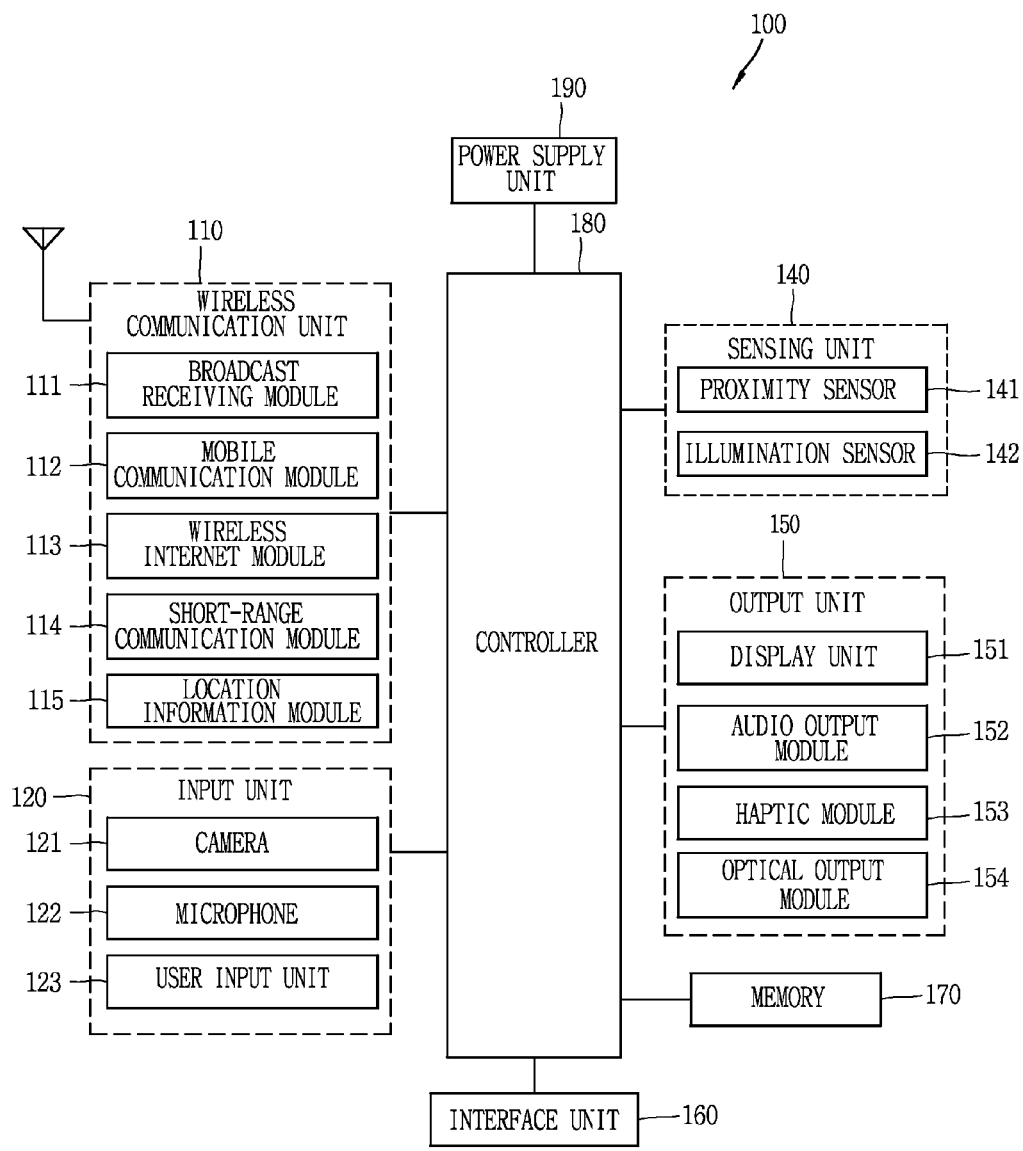
FIG. 1A is a block diagram of a mobile terminal according to an embodiment of the present invention.
Figure 1B:
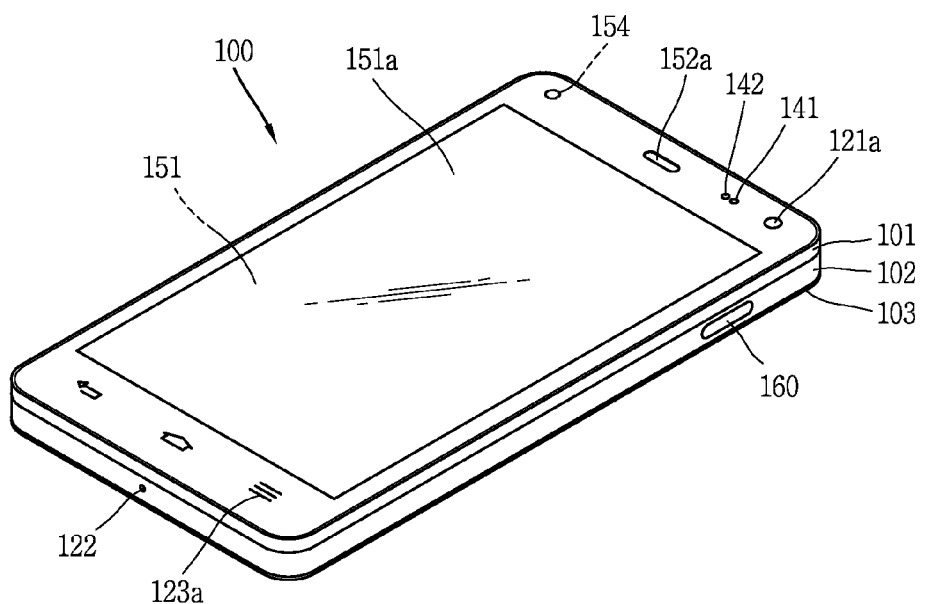
FIGS. 1B and 1C are conceptual views of one example of the mobile terminal, viewed from different directions.
Figure 1C:
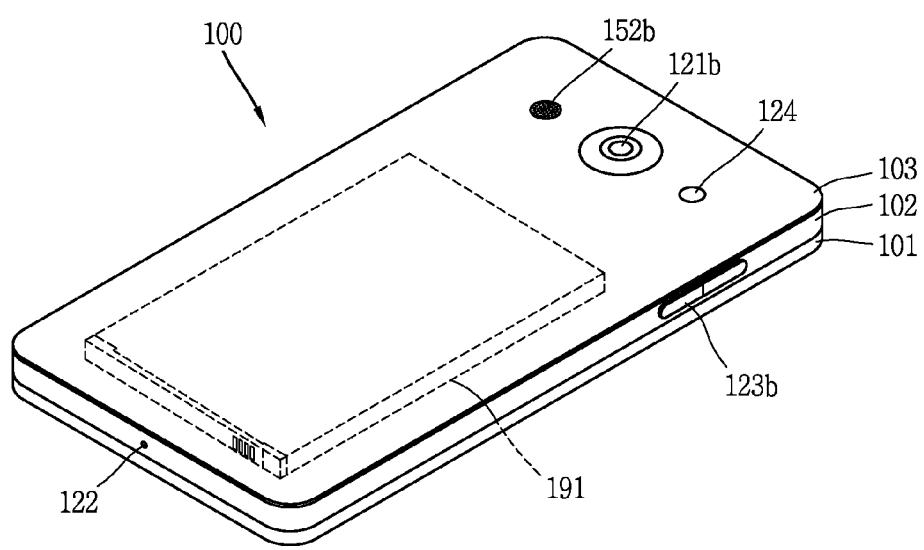

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. In addition, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. In addition, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this instance, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that can be implemented in the mobile terminal configured as described above will be described with reference to the accompanying drawings. It is apparent to those skilled in the art that modification, alteration, and improvement can be made to the present invention within a scope that does not deviate from the nature and gist of the present invention.

Also, the mobile terminal according to an embodiment of the present invention that may include one or more of the components as discussed above may execute a voice recognition function based on a touch input applied when a display unit is deactivated. In addition, deactivation of the display unit 151 may refer to when lighting of the display unit 151 is turned off and screen information related to a function executed in the mobile terminal is not displayed. Conversely, activation of the display unit 151 may refer to when lighting of the display unit 151 is turned on and screen information is displayed.

Also, the mobile terminal according to an embodiment of the present invention may be in a locked state in which the display unit 151 is deactivated and reception of a control command applied from the user is limited. In addition, when the mobile terminal is in the locked state, the user is limited in executing functions executable in the mobile terminal. In this instance, the user cancan switch the locked state into a released state and execute the executable functions. In addition, in order to switch the locked state to a released state, the related art mobile terminal activates the display unit 151 and receives a user's control command for switching the locked state to a released.

Figure 3A:
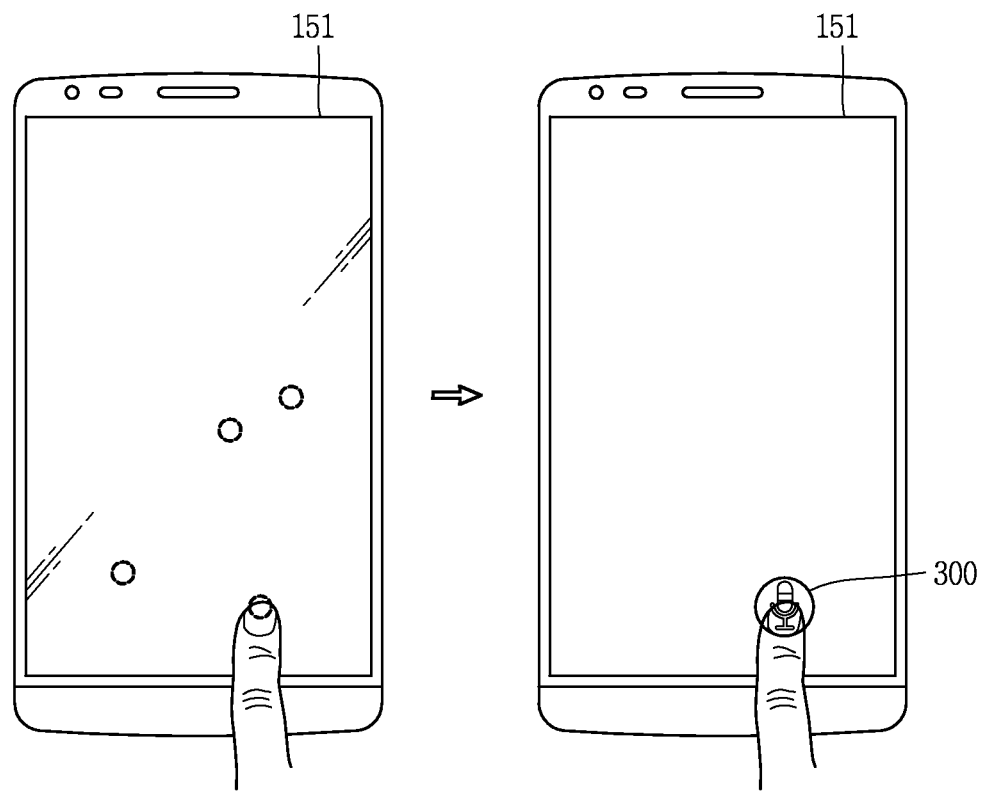
FIGS. 3A, 3B and 3C are conceptual views illustrating the control method of FIG. 2.
Figure 3B:
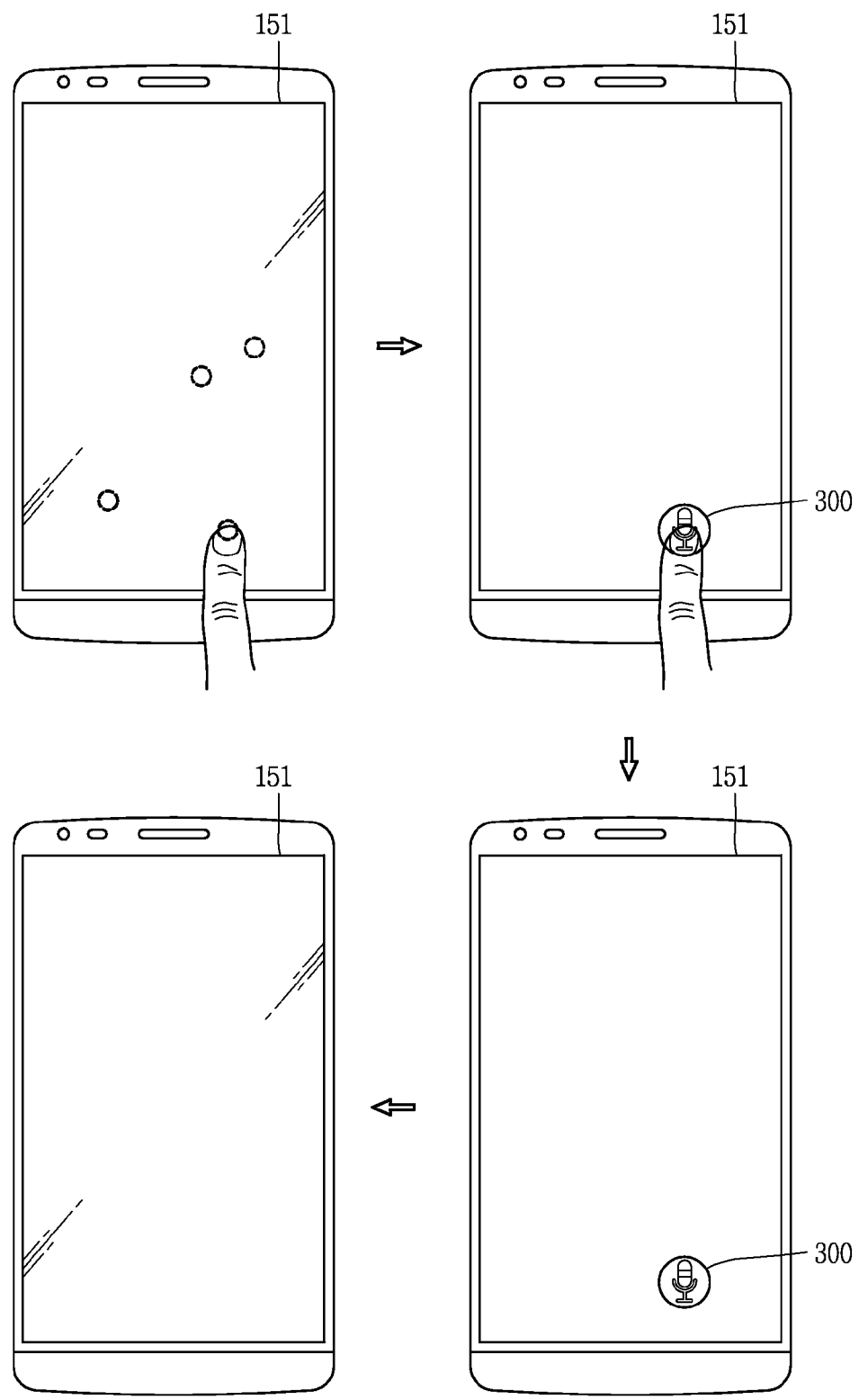
Figure 3C:
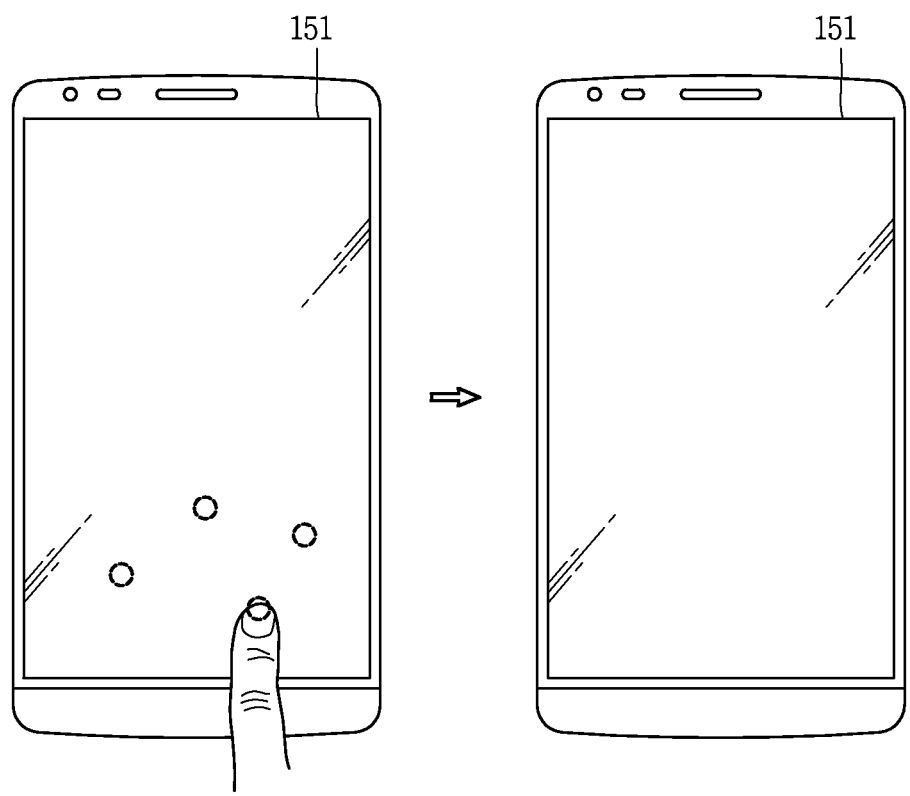

In comparison, in an embodiment of the present invention, a method for executing a voice recognition function based on a control command applied to the display unit 151, while the display unit 151 is maintained in a deactivated state, is provided. In particular, FIG. 2 is a flow chart illustrating a method for executing a voice recognition function based on a control command applied to a display unit, while the display unit is maintained in a deactivated state. Also, FIGS. 3A, 3B and 3C are conceptual views illustrating the control method of FIG. 2.

As shown in FIG. 2, the controller 180 sense a plurality of taps when the display unit 151 is deactivated in step S210. In addition, the mobile terminal may be in a locked state in which the display unit 151 is deactivated. Also, the mobile terminal may be in an unlocked state even through the display unit 151 is in the deactivated state. In addition, whether the mobile terminal is in the locked state or in the unlocked state may be determined according to a user selection or a pre-set condition.

Hereinafter, when the display unit 151 is in a deactivated state, and if a manipulation is not applied, the mobile terminal is in a locked state. Meanwhile, the mobile terminal according to an embodiment of the present invention may include a sensing unit for sensing a tap applied to the display unit even when the display unit 151 is deactivated and the mobile terminal is locked.

In addition, when the mobile terminal is in a locked state, although reception of a control command received from the user is limited, the controller 180 can sense a plurality of taps applied to the display unit 151. In addition, the tap may be a tap applied to the terminal body. In more detail, the tap may be defined as a user's gesture of tapping on an object.

In order to sense a tap applied when the display unit 151 is deactivated, the mobile terminal is in a doze mode in which the sensing unit is activated at every pre-set period. In addition, the doze mode corresponds to the sensing unit being activated to sense a tap applied to the display unit at every preset period. In this instance, the power consumption of the mobile terminal can be reduced, compared with an active mode in which the sensing unit is activated all the time.

When a tap is sensed in the doze mode, the controller 180 can switch the mobile terminal to an active mode. Thereafter, when a tap is not sensed for a preset period of time, the controller 180 can enter the doze mode. When a plurality of taps are sensed, a pattern formed by the plurality of sensed taps are identical to a preset pattern, and a finally applied tap among the plurality of taps is maintained, the mobile terminal according to an embodiment of the present invention may execute a voice recognition function in step S220.

When the display unit 141 is deactivated, and when a plurality of taps are sensed, the controller 180 can determine whether a pattern formed by the plurality of sensed taps is identical to the pre-set pattern. The preset pattern can be a pattern set by the user in advance or be set in advance when the mobile terminal is released from a factory. For example, the user can set a pattern by using a pattern setting function.

The controller 180 can form a pattern by using a combination of the plurality of touches. In more detail, the controller 180 can form a pattern by sequentially connecting regions to which the plurality of touches have been applied. In addition, the pattern may be set by sequentially touching pre-set regions of the display unit 151. In more detail, the display unit 151 may be divided into at least two regions. For example, the display unit 151 may be divided into four regions.

The four regions of the display unit 151 may sequentially be given identification numbers (for example, first to fourth regions). In addition, the controller 180 can set touches sequentially applied to the four regions in preset order, as a pattern. In addition, it is described that the display unit 151 is divided into four regions, but the present invention is not limited thereto and the display unit 151 may be divided into various numbers of regions, other than the four regions.

In addition, for example, as for two patterns, when the number of touches applied to form both patterns and order thereof are identical, even though at least one of the sizes of the patterns and the touch-applied positions thereof are different, the controller 180 can recognize that the patterns are identical. Namely, a pattern in this case may refer to the sameness in form or shape. In more detail, when one pattern having a size smaller than a pre-set size is applied to a region of the display unit 151, if the shape of the pattern is identical to that of the other pattern, the controller 180 can recognize the pattern as being identical to the other pattern and execute a function associated with the pattern.

Meanwhile, when a tap is applied by using a finger is described with reference to the accompanying drawings, but various tools may be used to apply a tap to the display unit 151, such as a stylus, or the like. When a pattern formed by the plurality of taps is identical to a pre-set pattern, the controller 180 can execute a function matched to the pre-set pattern. When the pattern formed by the plurality of taps is not identical to the pre-set pattern, the controller 180 can disregard the plurality of taps.

In addition, the function matched to the pre-set pattern includes various functions such as a function related to an operation of the mobile terminal, a function to execute a particular application, and the like. For example, the function matched to the pre-set pattern may be a function to switch a locked state to a released state, a function to execute a function matched to a pre-set pattern among applications installed in the mobile terminal, and the like.

Further, when the pattern formed by the plurality of taps is identical to the pre-set pattern, the controller 180 can detect whether a tap finally applied to the display unit 151 among the plurality of taps is maintained. Namely, the controller 180 can detect whether the finally applied tap among the plurality of taps is continuously applied.

In addition, when the finally applied tap is continuously sensed, the controller 180 can execute the voice recognition function. In this instance, the controller 180 can switch the locked state to a released state and execute the voice recognition function, or execute the voice recognition function when the locked state is maintained.

When the finally applied tap is not maintained, the controller 180 can not execute the voice recognition function. Namely, when the pattern formed by the plurality of taps applied to the display unit 151 is identical to the pre-set pattern and the finally applied tap is maintained, the controller 180 can execute the voice recognition function.

Also, after the voice recognition function is executed because the finally applied tap is maintained, and when the finally applied tap is released, the controller 180 can terminate the voice recognition function. Namely, the voice recognition can be executed only when the finally applied tap is maintained.

When the voice recognition function is executed, the controller 180 can activate the microphone provided in the mobile terminal in order to recognize a voice outside of the mobile terminal. In addition, the voice recognition function may be a function to analyze a voice received from the outside and control the mobile terminal according to a control command corresponding to the recognized voice. For example, when the voice recognition function is executed, the controller 180 can execute an application installed in the mobile terminal by using a voice received from the user.

Thus, an embodiment of the present invention provides a method for immediately executing a function that does not require outputting of visual information, namely, the voice recognition function, even when the display unit 151 is deactivated. In addition, embodiments of the present invention are applicable to various other functions not requiring activation of the display unit 151, as well as to the voice recognition function.

Also, a function to control the mobile terminal only with a voice, without releasing a locked state of the mobile terminal is provided. Further, when the voice recognition function is executed, the controller 180 can output notification information indicating that the voice recognition function has been executed. The notification information may be output according to at least one of visual, acoustic, and tactile methods. Accordingly, the user can recognize that the voice recognition function is currently being executed and the voice recognition function can be used.

Hereinafter, a method of executing the voice recognition function will be described with reference to FIGS. 3A, 3B, and 3C. First, as illustrated in FIG. 3A, when the display unit 151 is deactivated, the controller 180 senses a plurality of taps applied to the display unit 151. In FIG. 3A, the regions to which a plurality of taps have been applied are indicated by the dotted lines.

When the plurality of taps are sensed, the controller 180 can determine whether a pattern formed by the plurality of taps applied to the display unit 151 is identical to a preset pattern. In this instance, the pre-set pattern may be set by the user in advance or may be set in advance when the mobile terminal is released from a factory. When the pattern formed by the plurality of taps applied to the display unit 151 is identical to the preset pattern, the controller 180 can determine whether a finally applied tap among the plurality of taps is maintained. Namely, the controller 180 can determine whether the final tap is continuously sensed.

When the final tap is maintained, the controller 180 can execute the voice recognition function, while maintaining the display unit 151 in the deactivated state. Also, the controller 180 can execute the voice recognition function, while maintaining a locked state of the mobile terminal.

When the voice recognition function is executed, the controller 180 can output notification information indicating that the voice recognition function has been executed. For example, as illustrated in FIG. 3A, the controller 180 can activate a partial region of the deactivated display unit 151, and output a graphic object 300 indicating that the voice recognition function is being executed. When the final tap is maintained, the controller 180 can execute the voice recognition function. In other words, when the final tap is not maintained, the execution of the voice recognition function may be terminated.

As illustrated in FIG. 3B, when the final tap is maintained, the controller 180 can execute the voice recognition function. While the voice recognition function is being executed, and when the final tap is not maintained any longer, namely, when the final tap is not sensed any longer, the controller 180 can terminate execution of the voice recognition function. For example, as illustrated in FIG. 3B, when the voice recognition function is being executed, and when the user removes his or her finger from the display unit 151, the final tap may not be sensed any longer. At this time, the controller 180 can terminate execution of the voice recognition function.

Thus, in an embodiment of the present invention, when the display unit 151 is deactivated, the voice recognition function may be terminated, increasing user convenience. In addition, when a pattern formed by a plurality of taps applied to the display unit 151 is not identical to the preset pattern, the controller 180 can not execute the voice recognition function. For example, as illustrated in FIG. 3C, when an erroneous pattern is recognized, the controller 180 can not execute any function in the mobile terminal.

In addition, when a pattern not identical to the pre-set pattern is repeatedly sensed a predetermined number of times, the controller 180 can output notification information indicating that an erroneous pattern is being input. The notification information may be output through at least one of visual, acoustic, and tactile methods. Accordingly, in an embodiment of the present invention, the user can be informed to stop inputting the erroneous pattern and to input an accurate pattern.

So far, the method of executing the voice recognition function when the display unit 151 is deactivated has been described. Thus, a method of promptly executing a function, which does not require activation of the display unit 151 is provided. In addition, a method of activating the display unit and executing various functions only through the voice recognition function is provided.

Hereinafter, a method for executing various functions when the display unit is deactivated in the mobile terminal according to an embodiment of the present invention will be described. In particular, FIGS. 4A, 4B, 4C, 4D and 4E are conceptual views illustrating methods of executing various functions when the display unit is deactivated.

In more detail, when a pattern formed by a plurality of taps applied to the display unit 151 in a deactivated state is identical to a preset pattern, a function associated with the pattern may be executed, while maintaining the display unit 151 in the deactivated state. That is, when the display unit 151 is maintained to be deactivated, and when a pattern formed by a plurality of taps is identical to the preset pattern, the controller 180 can execute the voice recognition function.

Figure 4A:
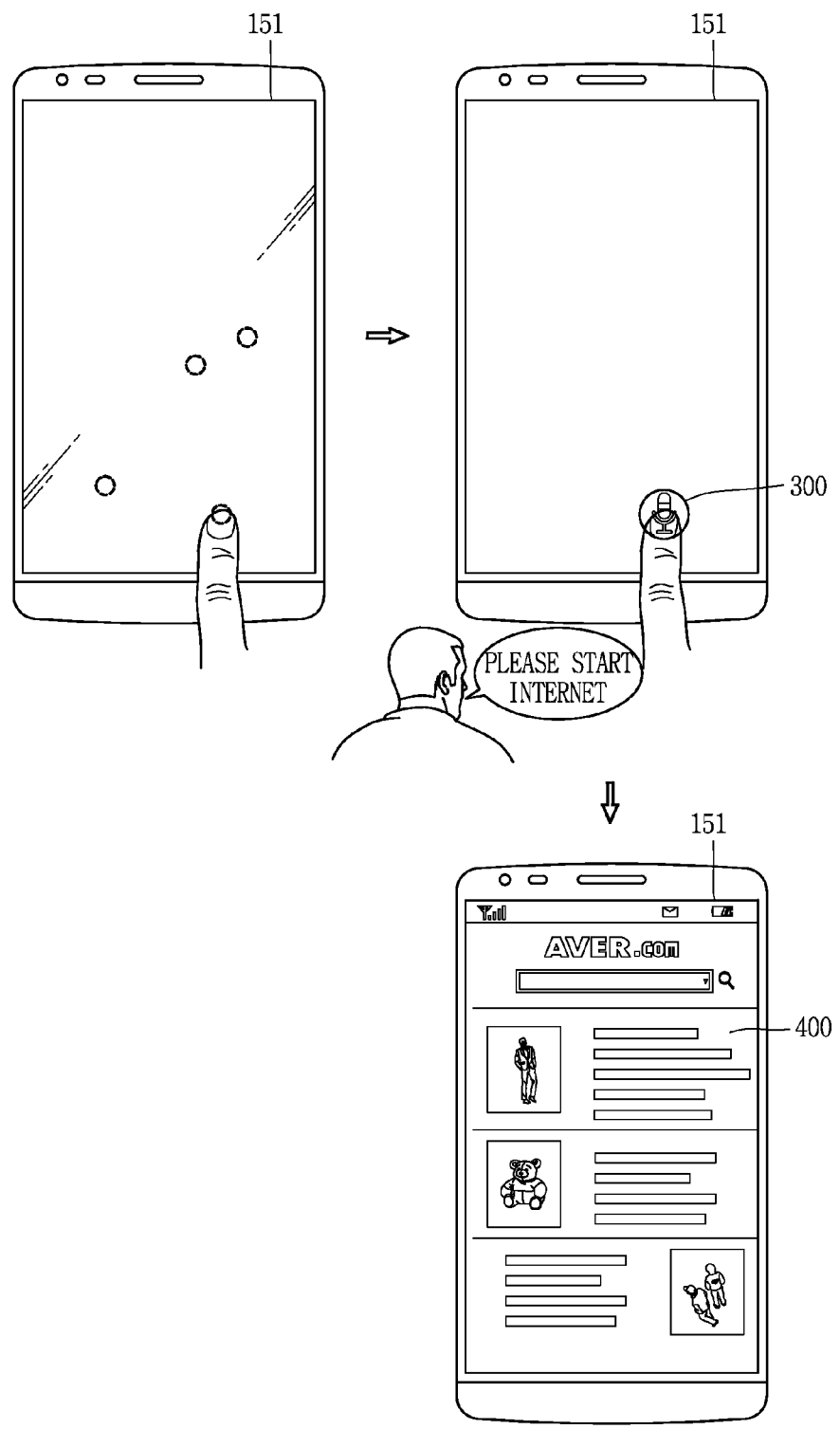
FIGS. 4A, 4B, 4C, 4D and 4E are conceptual views illustrating methods of executing various functions when the display unit is deactivated.

For example, as illustrated in FIG. 4A, when the display unit 151 is deactivated, the controller 180 can sense a plurality of taps applied to the display unit 151. In addition, when a pattern formed by the plurality of taps is identical to the preset pattern, the controller 180 can determine whether a finally applied tap, among the plurality of taps, is continuously sensed.

As illustrated in FIG. 4A, when the finally applied tap is continuously sensed, the controller 180 can execute the voice recognition function. When the voice recognition function is executed, the controller 180 can receive a voice from the outside (for example, the user). When a voice is received from the outside, the controller 180 can execute a function corresponding to the voice.

For example, as illustrated in FIG. 4A, the controller 180 can receive a voice "please start Internet" from the user. In addition, the controller 180 can analyze the voice and detect whether a function corresponding to the voice exists. In addition, in order to analyze the voice, a general voice recognition method may be used and a detailed description thereof will be omitted.

When a function corresponding to the voice exists, the controller 180 can execute the function corresponding to the voice. For example, as illustrated in FIG. 4A, when the function corresponding to the voice "please start Internet" is a function of executing a Web browser, the controller 180 can activate the display unit 151 and output screen information 400 indicating execution of a Web browser to the display unit 151.

Also, when the mobile terminal is in a locked state, the controller 180 can switch the locked state into a released state, and output the screen information 400 indicating execution of a Web browser. Meanwhile, when the finally applied tap is continuously maintained even after the particular function is executed by using the voice recognition function, the voice recognition function may be continuously maintained, rather than being terminated.

Figure 4B:
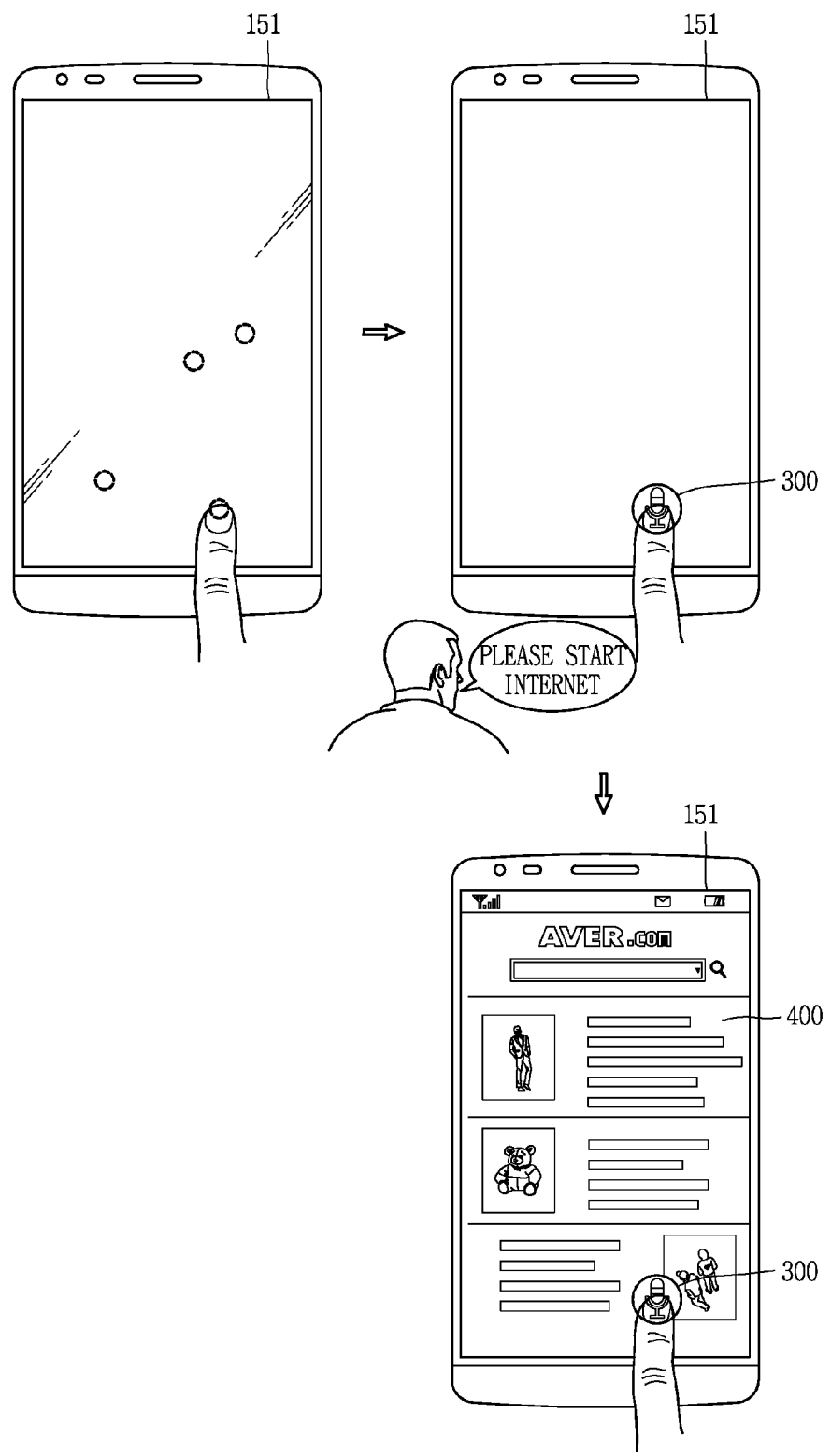

For example, as illustrated in FIG. 4B, the controller 180 can execute the voice recognition function by a plurality of taps applied to the display unit 151 in a deactivated state. Also, the controller 180 can execute a Web browser function by using the voice recognition function. In addition, the controller 180 can determine whether the finally applied tap, among the plurality of taps, is continuously sensed even after the Web browser function is executed. If the finally applied tap is continuously sensed, the controller 180 can not terminate the voice recognition function.

In addition, the controller 180 can control the voice recognition function such that the voice recognition function can be utilized for the function executed by the voice recognition function. For example, the controller 180 can control the voice recognition function so as to be utilized for the Web browser function. In more detail, as illustrated in FIG. 4B, the controller 180 can provide a method of searching for a word by voice within the Web browser function.

Figure 4C:
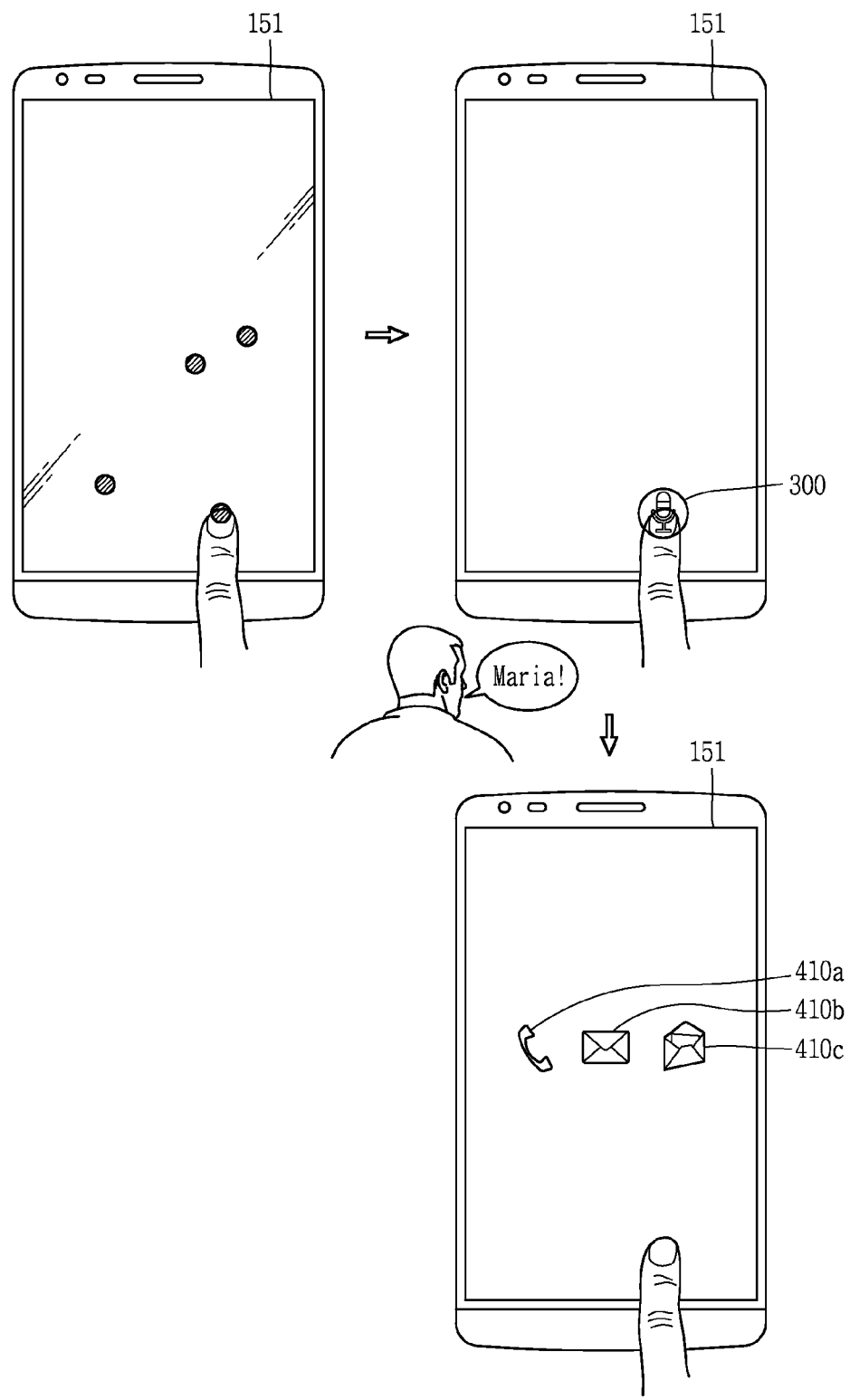

Also, after executing the voice recognition function based on the finally applied tap applied to the display unit 151 and maintained, the controller 180 can receive a voice from the user. In this instance, the controller 180 can detect a plurality of functions and a plurality of pieces of information corresponding to the user's voice. For example, as illustrated in FIG. 4C, the controller 180 can recognize a voice "Maria!."

In this instance, the controller 180 can detect a plurality of functions corresponding to the voice, for example, a "function to call Maria", a "function to send a message to Maria", a "function to send an e-mail to Maria", and the like.

In another example, the controller 180 can search for information related to Maria, such as a phone number of Maria, a call record related to Maria, a memo related to Maria, face-tag image information, and the like. In this instance, the controller 180 can output graphic objects 410a, 410b and 410c, respectively indicating the plurality of functions to one region of the display unit 151, rather than immediately executing the functions corresponding to the voice. Further, at least a portion of the display unit 151 in the deactivated state may be activated. For example, as illustrated in FIG. 4C, icons respectively corresponding to a "function (410a) to call Maria", a "function (410b) to send a message to Maria", and a "function (410c) to send an e-mail to Maria" may be output on at least a portion of the display unit 151.

Figure 4D:
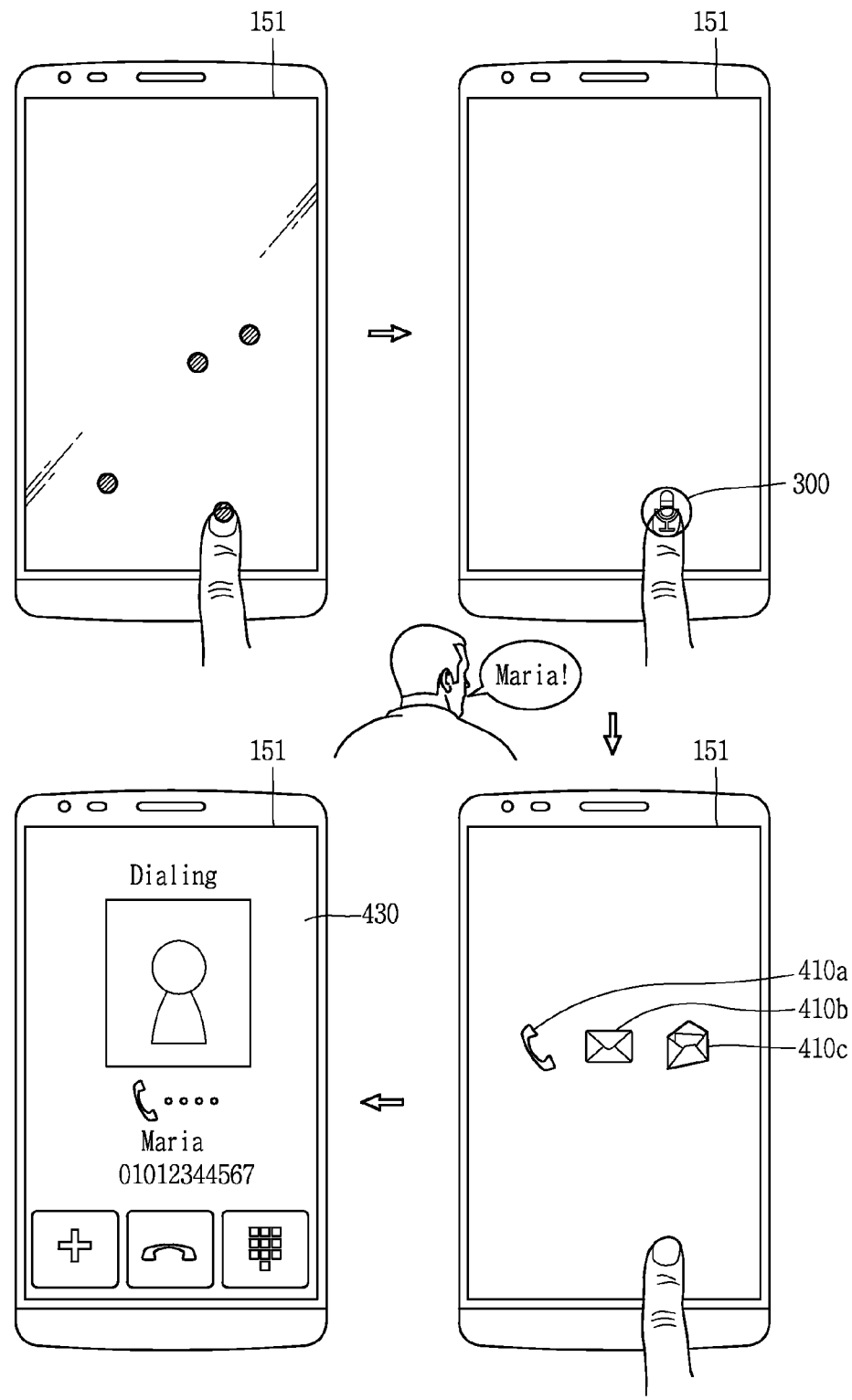

In addition, when any one of the plurality of graphic objects 410a, 410b, and 410c is selected, the controller 180 can execute the function denoted by the selected graphic object 410a. For example, as illustrated in FIG. 4D, when the icon denoting the "function (410a) to call Maria" is selected, the controller 180 can immediately perform the function to call "Maria." Also, the controller 180 can switch the display unit 151 from the deactivated state to the activated state, and output an execution screen 430 related to the function to call "Maria" to the display unit 151.

Figure 4E:
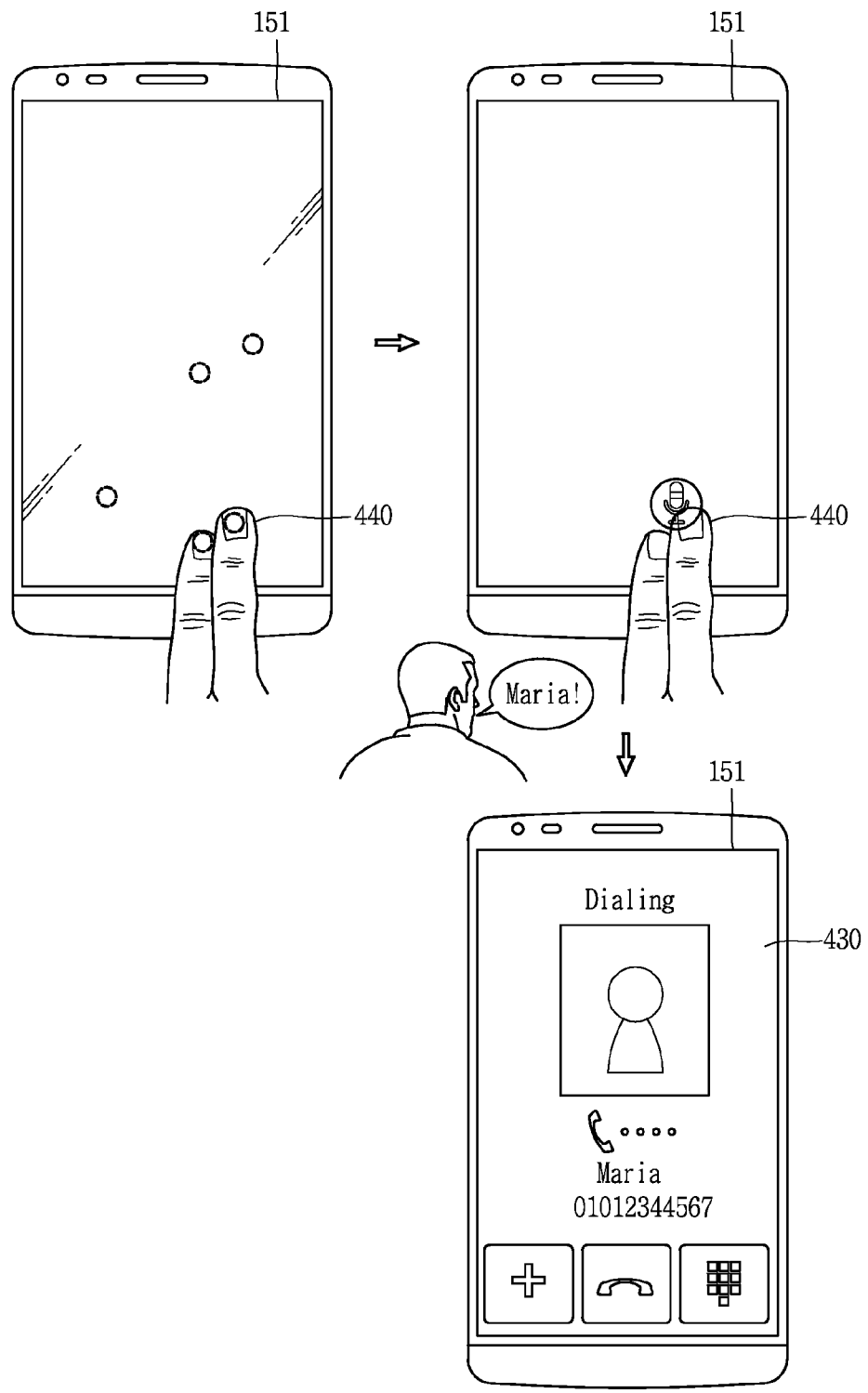

Meanwhile, when the plurality of taps are applied using at least two fingers, the controller 180 can immediately execute any one among a plurality of functions associated with the voice. For example, as illustrated in FIG. 4E, when a plurality of taps applied using at least two fingers 440 are sensed, the controller 180 can immediately execute the "function (410*a*) to call Maria." Thus, a method of performing various controlling through the voice recognition function executed when the display unit 151 is deactivated, is provided increasing user convenience.

Figure 5A:
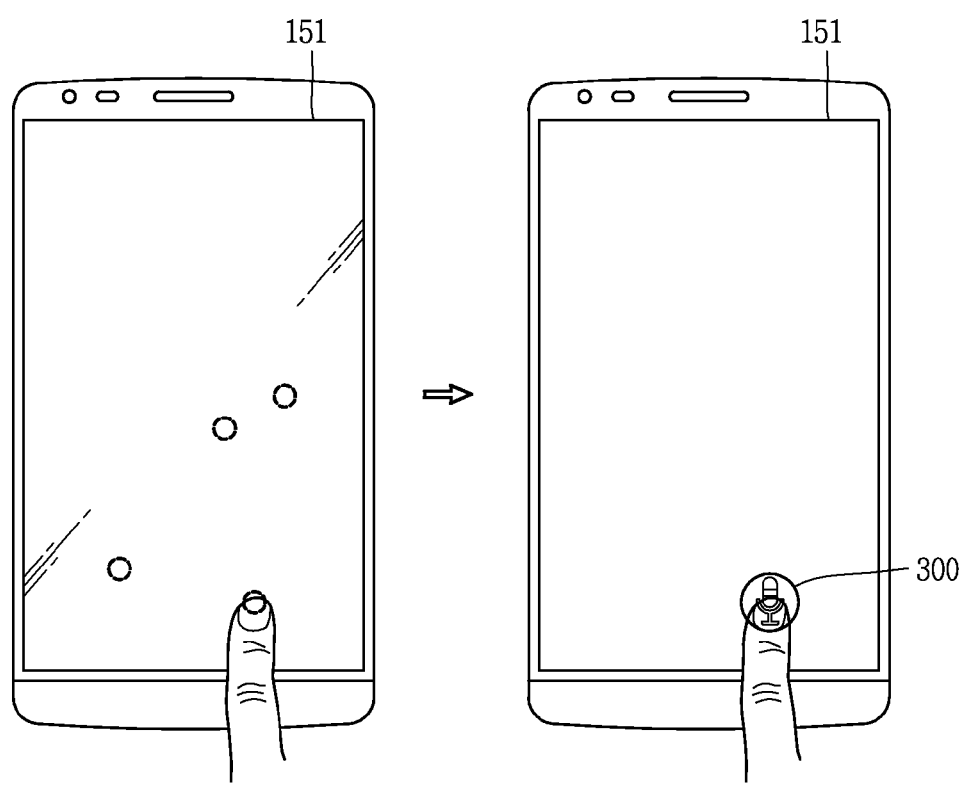
FIGS. 5A, 5B, 5C and 5D are conceptual views illustrating methods of outputting notification information indicating that a voice recognition function is being executed when the voice recognition function is executed when the display unit is deactivated.
Figure 5B:
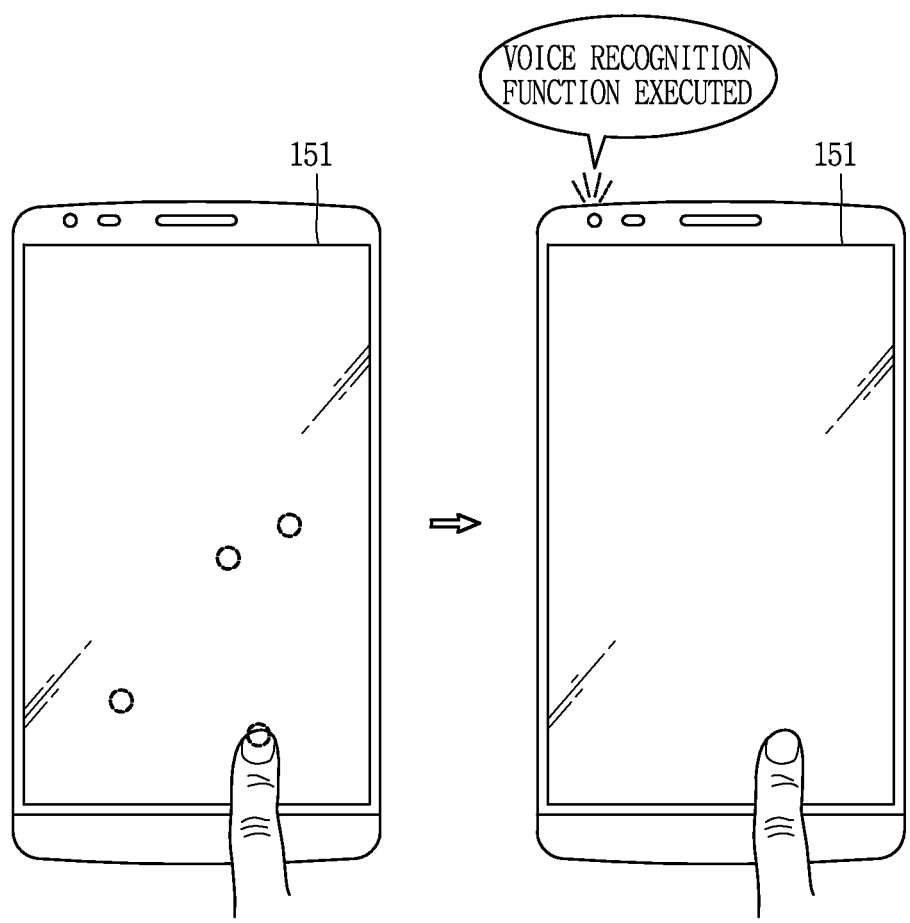
Figure 5C:
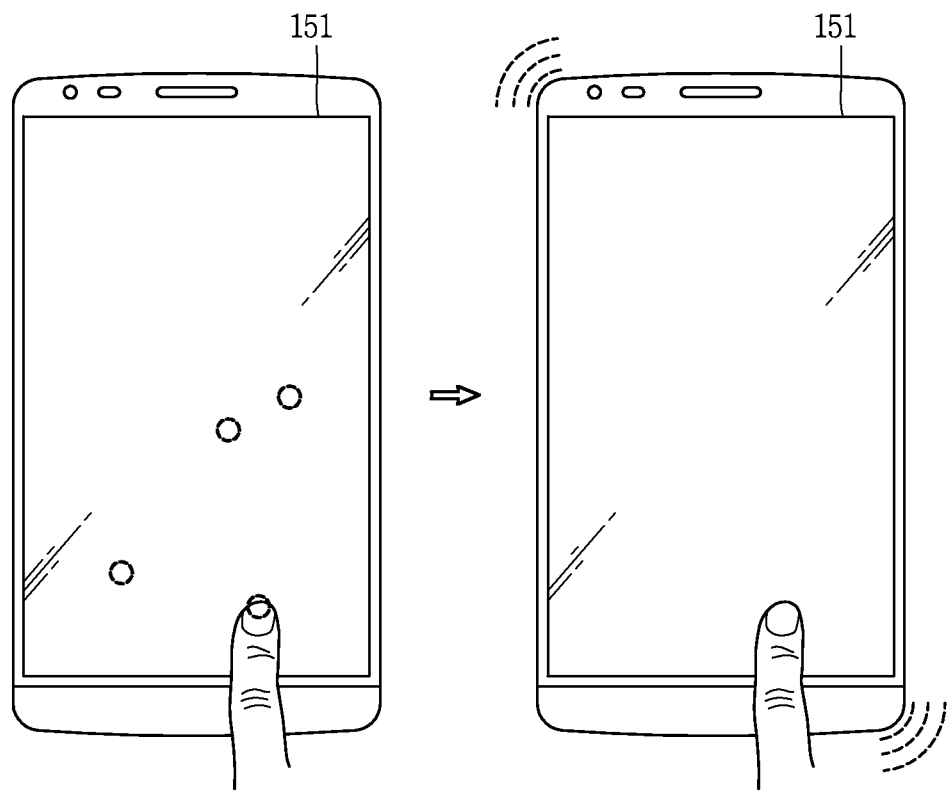

Hereinafter, a method of outputting notification information indicating that the voice recognition function is being executed will be described. FIGS. 5A, 5B and 5C are conceptual views illustrating methods of outputting notification information indicating that a voice recognition function is being executed when the voice recognition function is executed when the display unit is deactivated.

When the voice recognition function is executed by a plurality of taps applied when the display unit 151 is deactivated, the controller 180 can output corresponding notification information. This is because the user cannot easily recognize whether the voice recognition function has been executed, due to the deactivated display unit 151.

The notification information indicating that the voice recognition function has been executed may be output according to any one among visual, acoustic, and tactile methods. For example, as illustrated in FIG. 5A, one region of the deactivated display unit 151 can be activated and the notification information can subsequently be output as a graphic object 300 to the one region. In addition, the graphic object 300 can be output to the region to which the final tap has been applied. Also, the graphic object 300 can be output to a central portion of the display unit 151.

In another example, as illustrated in FIG. 5B, the notification information can be output using light from the light emitting unit. For example, when the voice recognition function is executed, the controller 180 can output light using an LED. In another example, as illustrated in FIG. 5C, the notification information can be output through vibrations.

In an embodiment of the present invention, information indicating that a voice can be recognized can be provided for the user when the display unit 151 is deactivated. Accordingly, the user can be provided with the information indicating that his or her voice can be recognized currently.

In addition, when the voice recognition function is executed, and when a voice is not input and the final tap is not sensed any longer, the controller 180 can output notification information indicating that the voice recognition function is being executed. In more detail, when the voice recognition function is executed, and when the sensing of the final tap is terminated, namely, when the user terminates tap input without inputting a voice from the outside, the controller 180 can determine that the user can not recognize the execution of the voice recognition function.

Figure 5D:
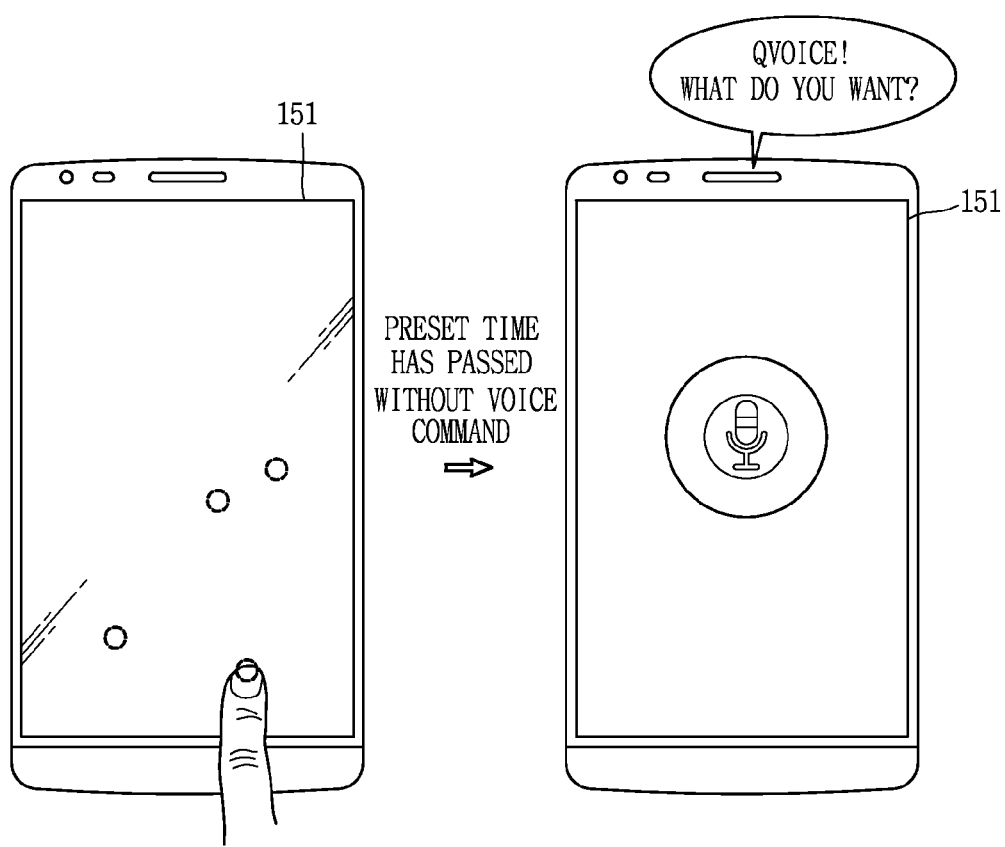

In this instance, in order to inform the user that the voice recognition function is being currently executed, the controller 180 can output notification information indicating that the voice recognition function is being executed. For example, as illustrated in FIG. 5D, the controller 180 can provide information indicating that the voice recognition function is being executed through the speaker or may activate a region of the display unit 151 and output a graphic object indicating that the voice recognition function is being executed. Namely, even when the final tap is not maintained, the controller 180 does not terminate the voice recognition function but continues to execute the voice recognition function.

When the voice recognition function is executed even when the user's final tap is not maintained, the controller 180 can receive the user's voice and execute a corresponding function, while maintaining the display unit 151 in the deactivated state. For example, with the display unit 151 deactivated, and when a voice "Now, what time" is received, the controller 180 can output the current time using a voice.

Also, when a current output state is an etiquette mode in which a voice is limited, the controller 180 can visually output a function corresponding to the user's voice, rather than outputting a voice. In an embodiment of the present invention, even when the user does not recognize that the voice recognition function is being executed and tap input is terminated due to the deactivated state of the display unit 151, the user can be informed again about the fact that the voice recognition function is being executed. Accordingly, the user is induced to recognize that the voice recognition function is being executed, and to use the voice recognition function.

Hereinafter, a control method when a user's voice is received while at least a portion of a plurality of taps is being applied when the display unit 151 is deactivated will be described. In particular, FIGS. 6A, 6B, 6C and 6D are conceptual views illustrating control methods when a user's voice is received while at least a portion of a plurality of taps is being input when the display unit is deactivated.

When the display unit 151 is deactivated, the controller 180 can sense a plurality of applied taps. In addition, the controller 180 can form a pattern based on the plurality of sequentially applied taps, and execute a function associated with the pattern based on the pattern. For example, based on a pattern formed by four tap inputs, the controller 180 can execute the voice recognition function.

When at least a portion of the plurality of taps forming the pattern is recognized, the controller 180 can receive a voice from the user. In this instance, in order to recognize the user's voice, the controller 180 can execute the voice recognition function. Namely, in an embodiment of the present invention, when only at least a portion of the plurality of taps is input, the controller 180 can execute the voice recognition function promptly.

The controller 180 can analyze the received voice with the executed voice recognition function. In this instance, the controller 180 can detect whether the other remaining taps among the plurality of gaps are applied, rather than immediately executing the function associated with the received voice. In addition, the controller 180 can detect whether a pattern formed by the taps applied before or after the voice is received is identical to a pre-set pattern. When the pattern formed by the applied taps is identical to the pre-set pattern, the controller 180 can immediately execute a function associated with the voice.

Figure 6A:
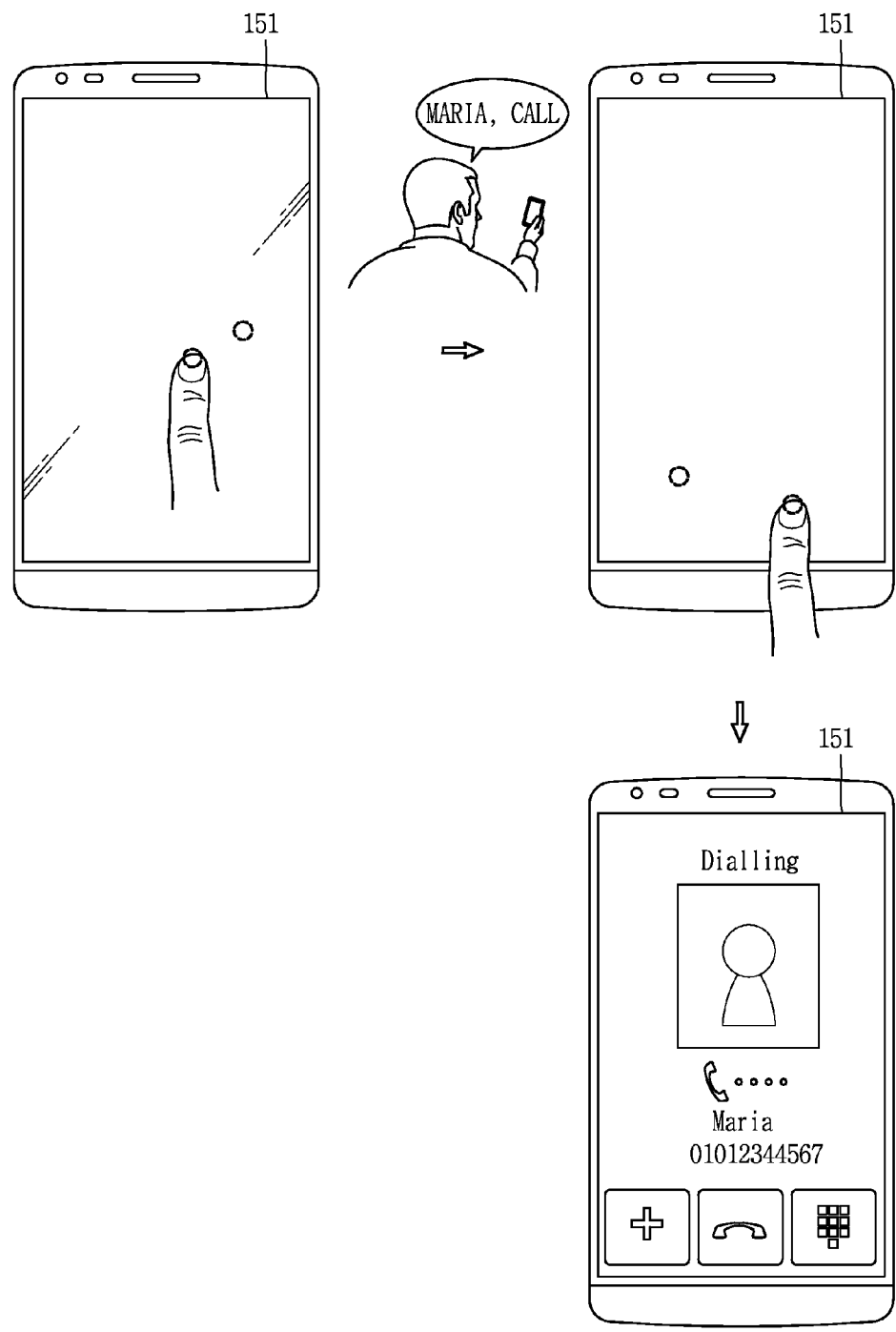
FIGS. 6A, 6B, 6C and 6D are conceptual views illustrating control methods when a user's voice is received while at least a portion of a plurality of taps is input when the display unit is deactivated.

For example, as illustrated in FIG. 6A, while a plurality of taps are being applied when the display unit 151 is deactivated, the user can input a voice. For example, the voice may be "Maria, call." In addition, based on the reception of the user's voice, the controller 180 can execute the voice recognition function and analyze the voice.

Also, the user can set the voice recognition function to be executed once a preset number of taps, among the plurality of taps, are input. For example, the user can set such that the voice recognition function is executed when a second tap is input when a pattern formed by four taps. In addition, the controller 180 can detect whether the other remaining taps are applied, rather than immediately executing the function associated with the voice.

Thereafter, when the pattern formed by the taps applied before or after the user's voice is received is identical to a pre-set pattern, the controller 180 can immediately execute the function associated with the voice. For example, as illustrated in FIG. 6A, when all of the plurality of taps are applied, the controller 180 can execute a "function of calling Maria" associated with the voice "Maria, call."

In addition, if the pattern formed by the applied taps is not identical to the preset pattern after the voice recognition function is executed, the controller 180 can automatically terminate the voice recognition function. In more detail, after the voice recognition function is executed, and when the other remaining taps are erroneously applied, the controller 180 does not execute the voice recognition function. Namely, even after the voice recognition function is quickly executed, only when all of the plurality of taps are accurately applied, the controller 180 can execute the function related to the voice recognized through the voice recognition function.

Also, when a voice is input while the plurality of taps are being applied, if it is determined that the voice is inaccurately input, the controller 180 can allow the user to check whether the voice is accurate, after the plurality of taps are applied. In addition, when the voice is inaccurately input includes when there is no function associated with the input voice, when pronunciation of the input voice is too inaccurate to be recognized, and the like.

Figure 6B:
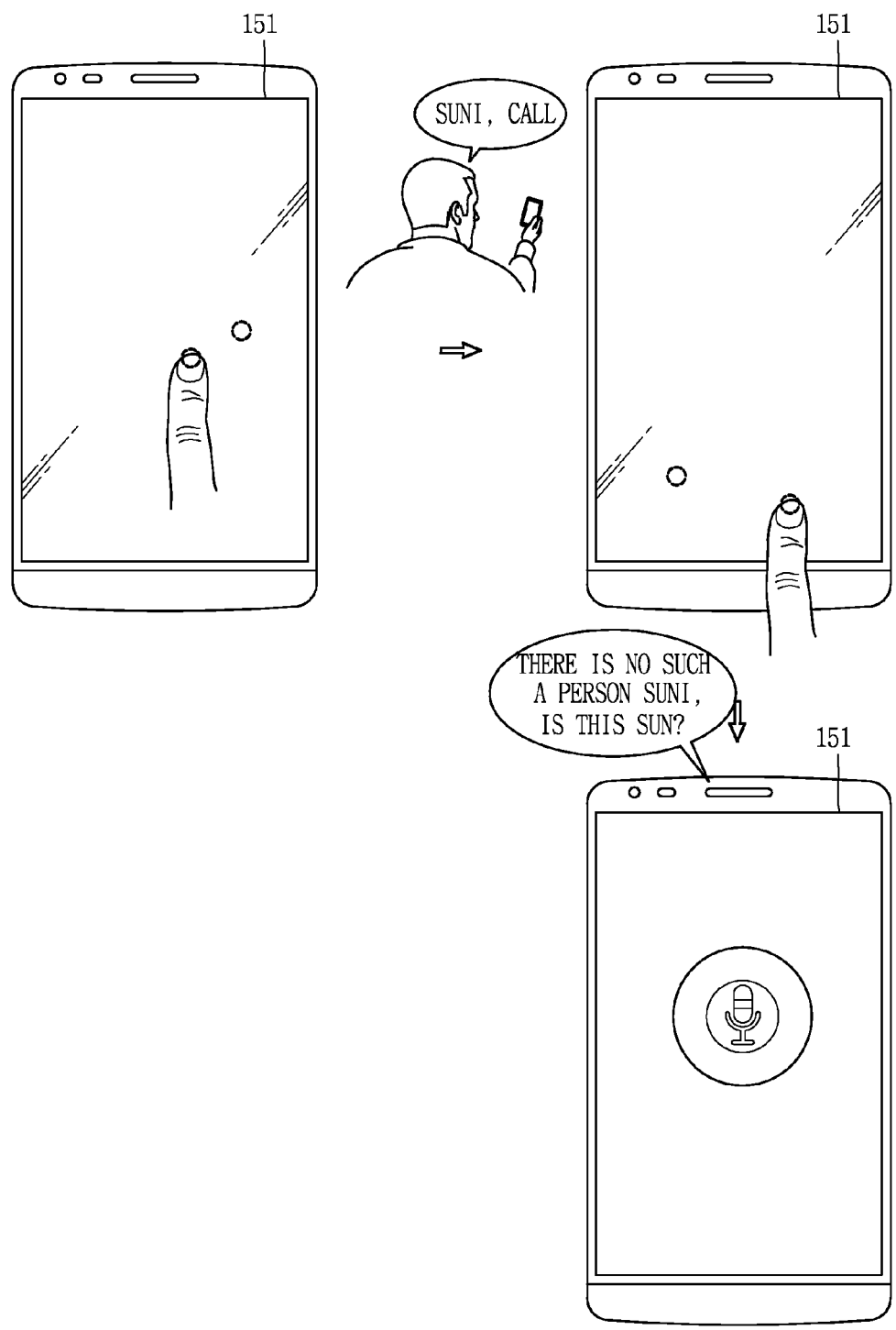

For example, as illustrated in FIG. 6B, the user can input a voice while a plurality of taps are being applied. When it is determined that the voice input while the plurality of taps were being applied is inaccurate, the controller 180 can ask the user whether the voice has been accurately input. In addition, with respect to the inaccurately input voice, the controller 180 can recommend a function associated with the most similar pronunciation. For example, as illustrated in FIG. 6B, the controller 180 can recommend a function of "Sun, call" most similar to the input voice "Suni, call."

In the above, the voice recognition function being executed based on the reception of a voice has been described, but the voice recognition function may be immediately executed based on a first tap applied when the display unit 151 is deactivated. In this instance, when the pattern applied after the voice recognition function is executed is identical to the preset pattern, the controller 180 can recognize the voice based on the voice recognition function.

Figure 6C:
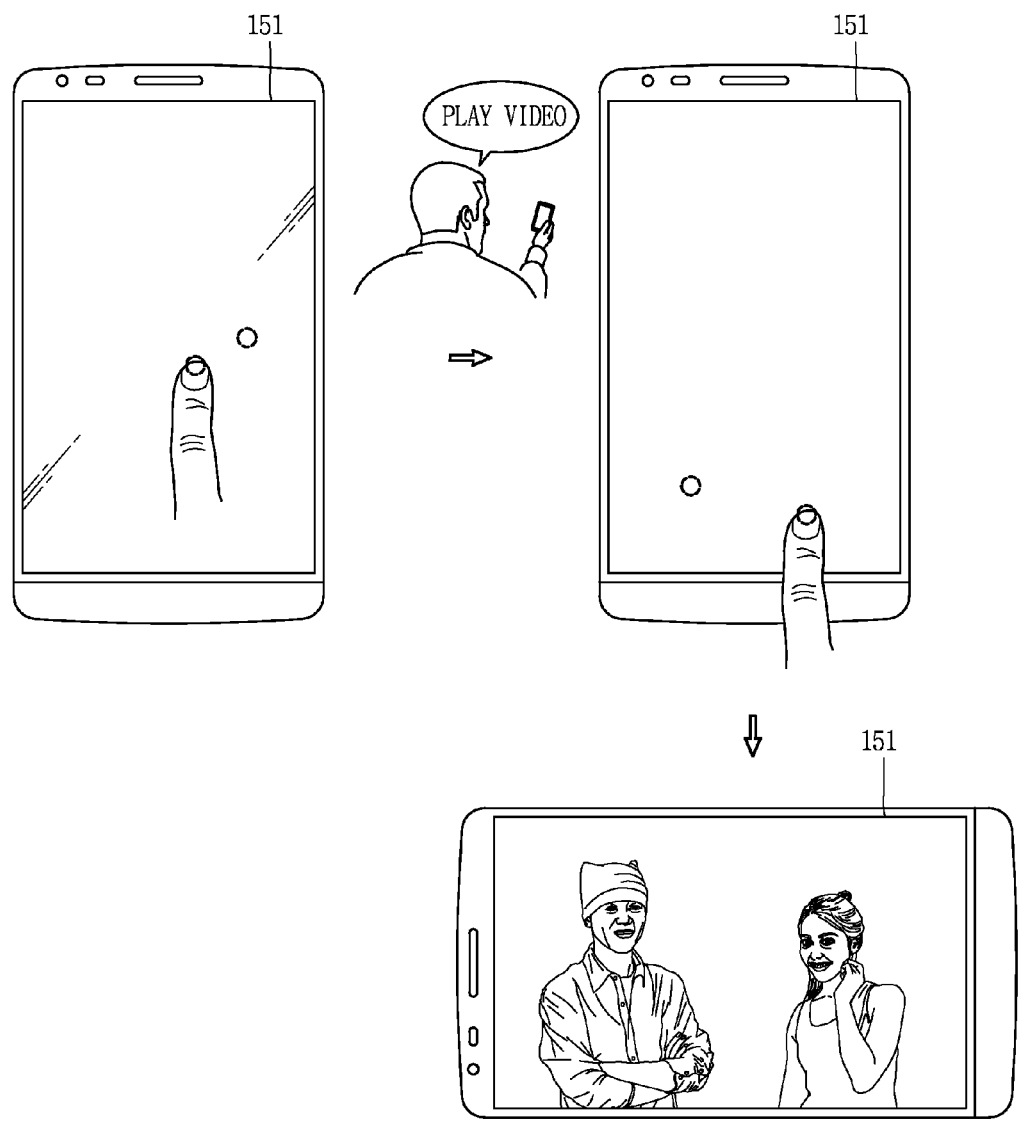

For example, as illustrated in FIG. 6C, when a tap is applied while the display unit 151 is deactivated, the controller 180 can immediately execute the voice recognition function. In this instance, while the taps are being continuously applied, the controller 180 can receive a voice from the user.

When, when a pattern formed by the plurality of patterns is identical to the preset pattern, the controller 180 can execute a function associated with the voice. For example, as illustrated in FIG. 6C, the controller 180 can execute a "voice play function" associated with a voice "video play."

As described above, the voice recognition function can be executed even when at least a portion of the plurality of taps is applied. Namely, even though all of the plurality of taps are not input, the voice recognition function can be quickly executed. In this instance, the user's selection can be received on, among the plurality of tabs, the tab at which the voice recognition function is to be executed.

Figure 6D:
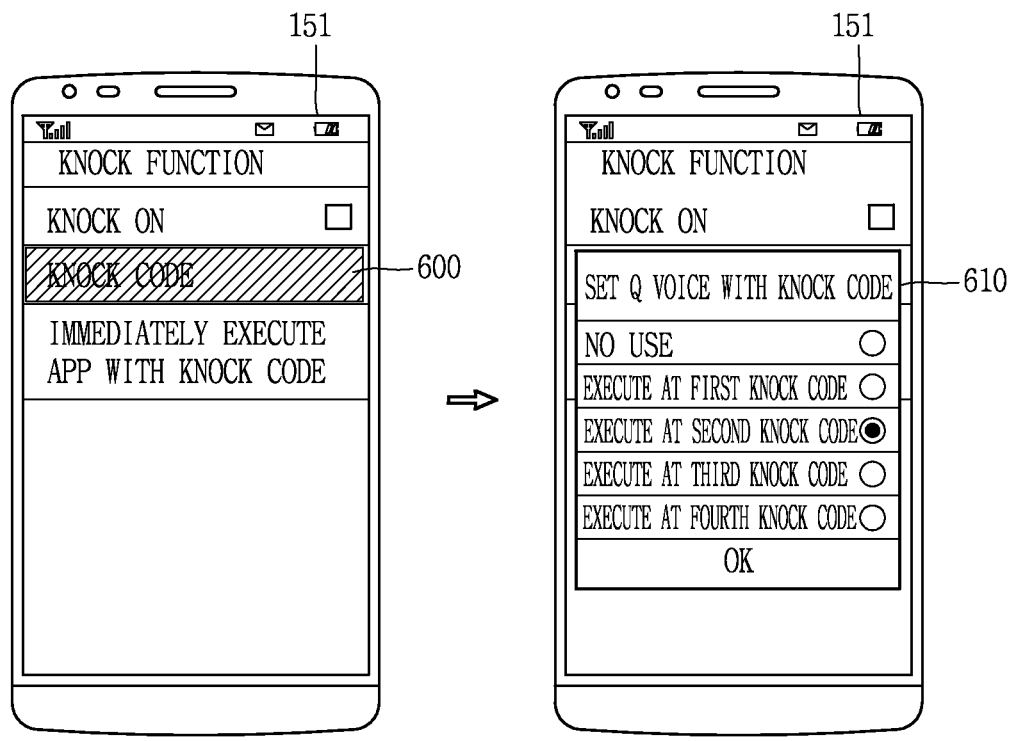

For example, as illustrated in FIG. 6D, the mobile terminal according to an embodiment of the present invention provides a configuration screen for setting a function related to patterns formed by a plurality of taps applied when the display unit 151 is deactivated. In addition, the function related to a pattern formed by a plurality of taps applied when the display unit 151 is deactivated is called as "knock code" 600. In addition, the knock code may be called by various other names.

When the "knock code" 600 item is selected, as illustrated in FIG. 6D, the controller 180 can set a tap for executing the voice recognition function, among a plurality of taps. In more detail, the controller 180 can receive the user's selection on which one of the plurality of tabs sequentially applied the voice recognition function is to be executed at. For example, as illustrated in FIG. 6D, the display unit 151 can output screen information for receiving the selection on the tap at which the voice recognition function is to be executed.

Accordingly, even when only at least a portion of a plurality of taps is applied when the display unit 151 is deactivated, the user can input a voice. Also, even though all of the plurality of taps are not input, the controller 180 can execute the voice recognition function quickly.

So far, the control method when a voice is received while a plurality of taps are applied has been described. In an embodiment of the present invention, even when a voice is received while a plurality of taps are being applied, a function associated with the voice may be executed. Thus, even though the user inputs a voice by mistake while the plurality of taps are applied, the user desired function can be provided.

Figure 7A:
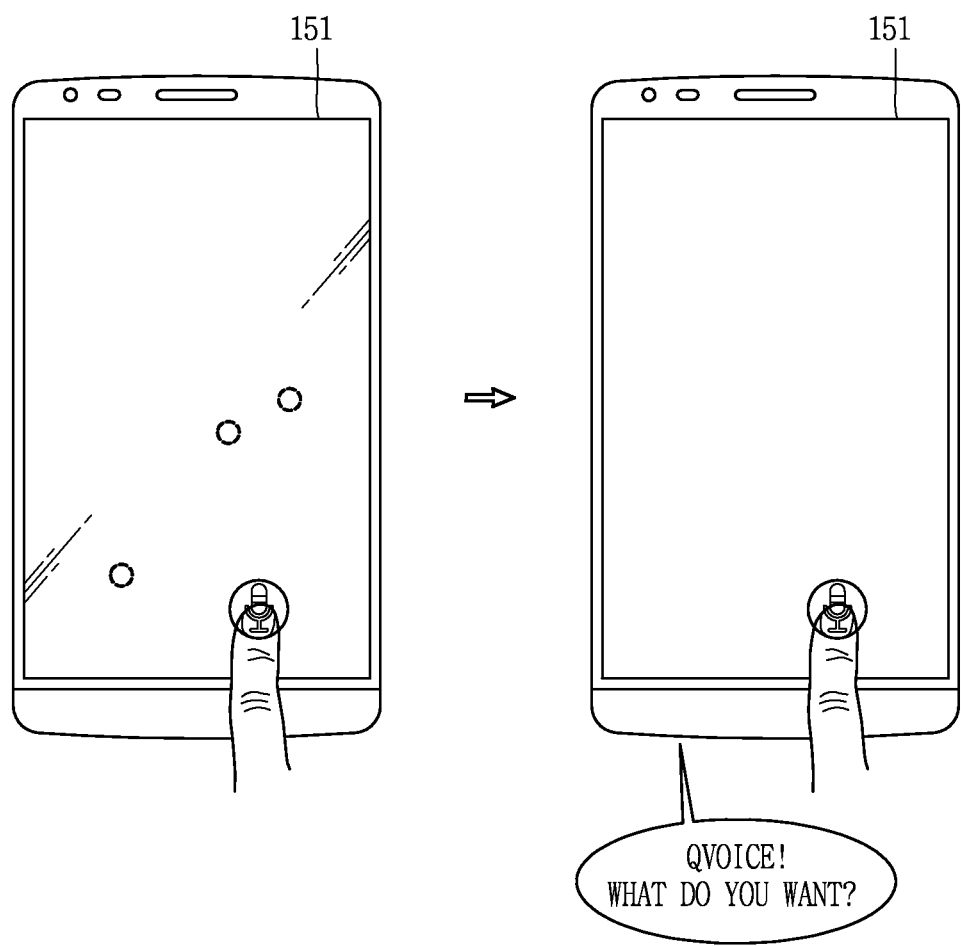
FIGS. 7A and 7B are conceptual views illustrating methods of executing a voice recognition function through different speakers according to a position of a terminal body.
Figure 7B:
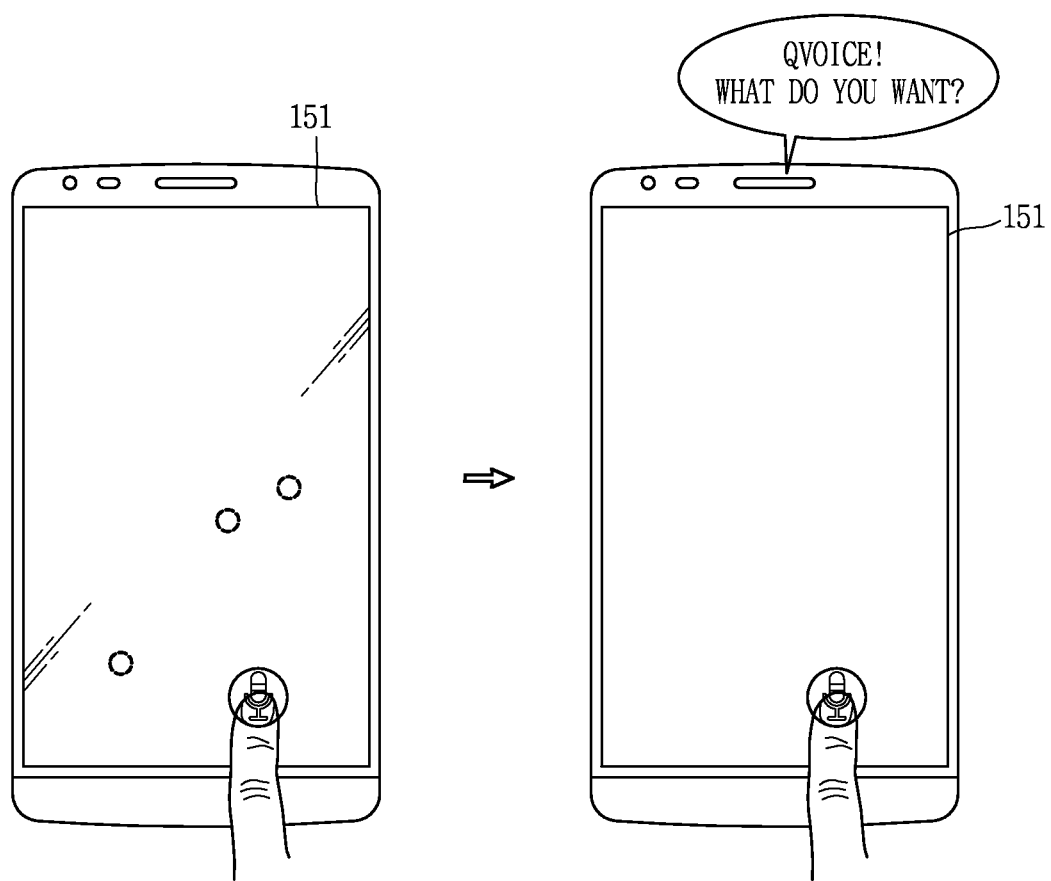

Hereinafter, a method for executing the voice recognition function through different speakers according to a position of the terminal body in a mobile terminal having at least two speakers will be described. In particular, FIGS. 7A and 7B are conceptual views illustrating methods of executing a voice recognition function through different speakers according to a position of a terminal body.

The mobile terminal according to an embodiment of the present invention may have at least two different speakers. For example, the mobile terminal can have first and second speakers having different maximum output magnitudes according to output paths.

In addition, whether to activate the first speaker and the second speaker can be determined according to an executed function. In more detail, the first speaker may be a speaker activated to output a sound to a subject who is present at a distance such as when video is played, and the second speaker may be a speaker activated to output a sound a subject who is present nearby such as in a call communication. Namely, the first speaker may be used to transmit a sound to a user who is away, and the second speaker may be used to transmit a sound to a user who is close, like call communication.

Based on a position of the terminal body, the controller 180 can determine which of the first and second speakers is to be used to output a sound. In more detail, when the voice recognition function is executed based on a plurality of taps applied when the display unit 151 is deactivated, the controller 180 can determine through which of the first and second speakers, a sound is to be output.

In this instance, the controller 180 can determine through which of the first and second speakers a sound is to be output based on a position of the terminal body. For example, as illustrated in FIG. 7A, when tilting of the terminal body is not sensed, the controller 180 can determine that the user is not performing call communication. In this instance, the controller 180 can activate the first speaker and execute the voice recognition function. This is because the controller 180 has determined that the user is away from the terminal body.

Also, as illustrated in FIG. 7B, when it is sensed that the terminal body tilts at an angle equal to or greater than a pre-set angle, the controller 180 can activate the second speaker and execute the voice recognition function through the second speaker. When the terminal body tilts at an angle equal to or greater than the pre-set angle, the controller 180 can determine that the user is close in proximity to the terminal body. For example, when the user is close in proximity to the terminal body may be when the user performs call communication.

The tilting of the terminal is described as one example. As described above, in another example, a sensing unit can sense how close or far a user is to the terminal. If the user is determined to be close to the terminal, a particular speaker is selected and the output volume is less. When the user is determined to be farther from the terminal, another speaker can be used with a higher output volume. Thus, the controller 180 can determined how close an object such as a user is to the mobile terminal and select the appropriate speaker and appropriate volume after receiving the plurality of taps.

Figure 8A:
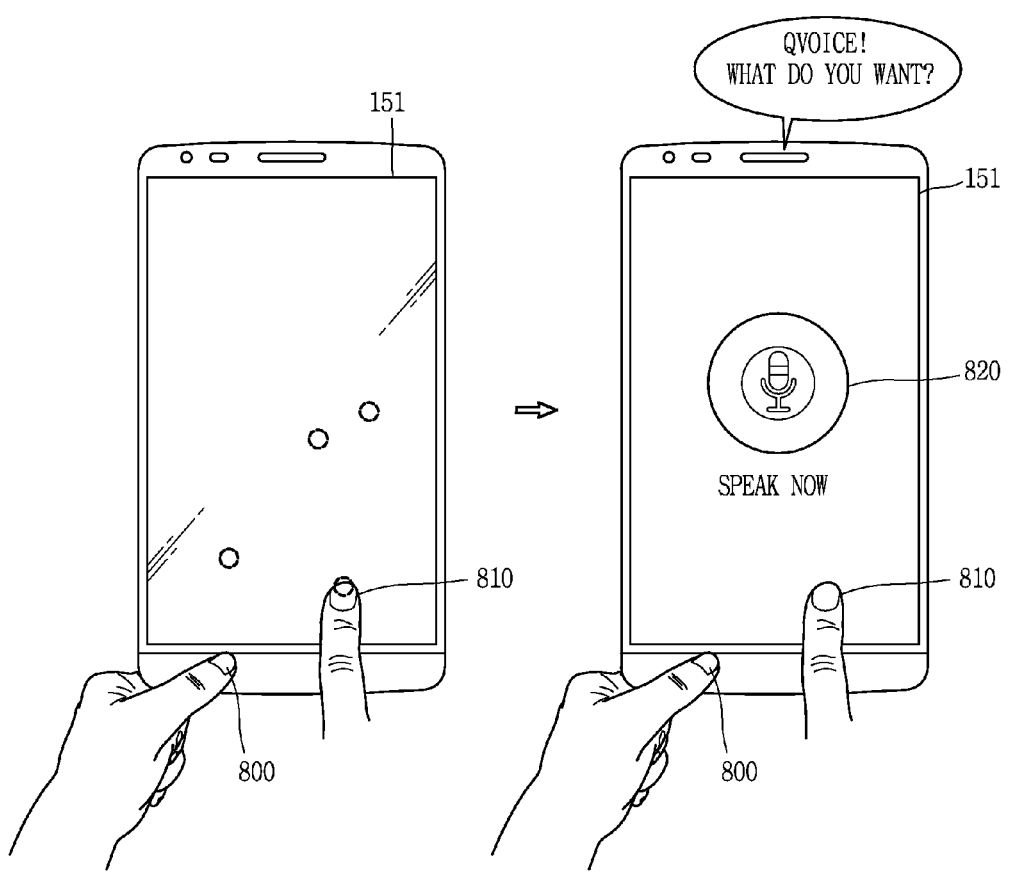
FIGS. 8A, 8B and 8C are conceptual views illustrating another method of executing a voice recognition function.

So far, the method of executing the voice recognition function by utilizing at least two speakers in the mobile terminal has been described. Hereinafter, another method for executing a voice recognition function will be described. In particular, FIGS. 8A and 8B are conceptual views illustrating another method of executing a voice recognition function.

The controller 180 can execute a voice recognition function based on a plurality of taps applied when the display unit 151 is deactivated, and also execute the voice recognition function based on an additional control command applied together with a plurality of taps. For example, as illustrated in FIG. 8A, when the display unit 151 is deactivated, the controller 180 can sense a touch 800 applied to a portion of the terminal body together with a plurality of taps 810 applied thereto. In addition, as illustrated in FIG. 8A, when sensing the touch 800 applied to a portion of the terminal body is maintained, and when a pattern formed by the plurality of taps 810 is identical to a preset pattern, the controller 180 can execute the voice recognition function and display a graphic object 820 requesting the user to speak now, and also a prompt asking what the user wants.

Figure 8B:
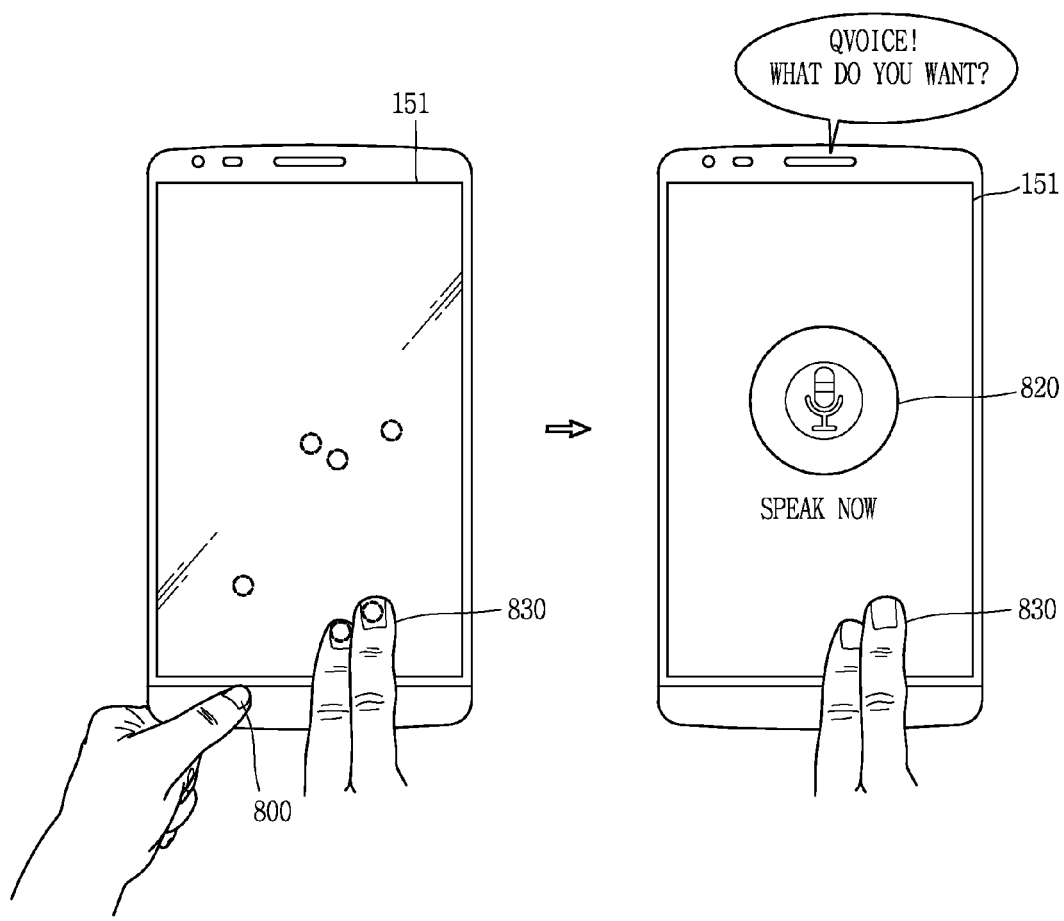

In another example, as illustrated in FIG. 8B, when the display unit 151 is deactivated, the user can apply a plurality of taps with two fingers 830. In addition, the controller 180 can continuously sense the touch 800 applied to a portion of the terminal body. In addition, the controller 180 can execute the voice recognition function. Namely, the controller 180 can execute the voice recognition function through the multi-touch input and display the graphic object 820 requesting the user to speak now, and also a prompt asking what the user wants.

Figure 8C:
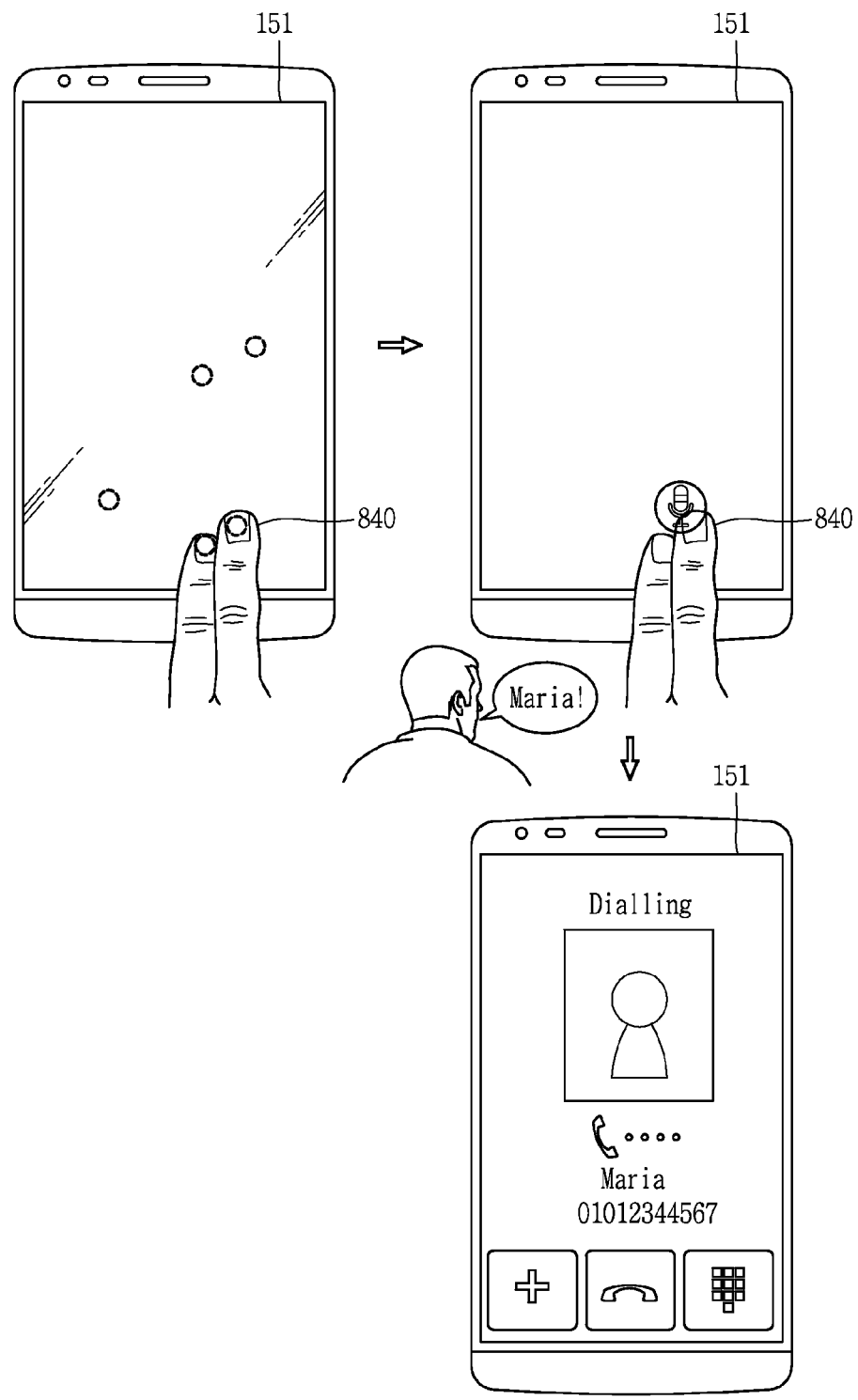

Meanwhile, when the plurality of taps are applied using at least two fingers in addition to the embodiment in FIG. 8B, the controller 180 can immediately execute any one among a plurality of functions associated with the voice. For example, as illustrated in FIG. 8C, when a plurality of taps applied using at least two fingers 840 are sensed, the controller 180 can immediately execute the "function to call Maria." Thus, a method of performing various controlling through the voice recognition function executed when the display unit 151 is deactivated, is provided increasing user convenience.

So far, various control methods for executing the voice recognition function when the display unit 151 is deactivated have been described. In addition, in an embodiment of the present invention, various other control methods may be added by a user setting. Hereinafter, a method for controlling a currently executed function based on a plurality of taps sensed when the display unit is deactivated will be described. In particular, FIG. 9 is a conceptual view illustrating a method of controlling a currently executed function based on a plurality of taps sensed when the display unit is deactivated.

In the mobile terminal according to an embodiment of the present invention, even when the display unit 151 is deactivated, a particular application may be in the middle of being executed. For example, an application related to music play may be in the middle of being executed. In addition, the application being executed even when the display unit 151 is deactivated may be an application not requiring activation of the display unit 151.

When a pattern formed by a plurality of taps applied when the display unit 151 is deactivated is identical to a preset pattern, the controller 180 can control the function being currently executed in the mobile terminal by using the finally applied tap among the plurality of taps. In more detail, with respect to the finally applied tap among the plurality of taps, the controller 180 can control the function being currently executed in the mobile terminal by using a drag input continued from the final tap.

Figure 9:
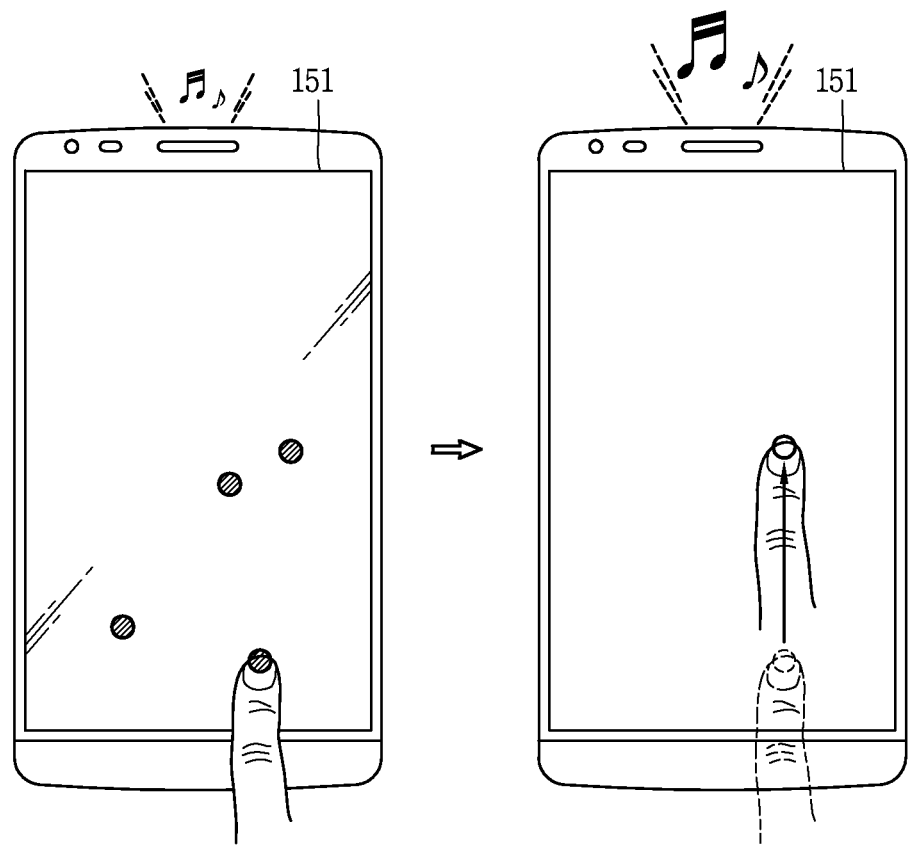
FIG. 9 is a conceptual view illustrating a method of controlling a currently executed function based on a plurality of taps sensed when the display unit is deactivated.

For example, as illustrated in FIG. 9, an application to perform a music play function may be currently executed in the mobile terminal. In addition, the user can apply a plurality of taps to the display unit 151 when the display unit 151 is deactivated. When a pattern formed by the plurality of taps is identical to a preset pattern and a drag input continued from a finally applied tap among the plurality of taps is applied, the controller 180 can control an application representing a music play function.

In addition, the controller 180 can perform various controlling based on a direction of the drag input. For example, a horizontal drag input may correspond to a function of playing previous music and next music, and a vertical drag input may correspond to a volume control function. For example, as illustrated in FIG. 9, the controller 180 can control the volume of the currently executed music play application based on the drag input. Thus, the user can control an application being executed in the mobile terminal, even when the display unit 151 is deactivated. Thus, the user's convenience is increased.

The mobile terminal according to an embodiment of the present invention can execute a function which does not require activation of the display unit, based on an operational pattern formed by a plurality of taps applied to the terminal body when the display unit is deactivated. In this instance, since various functions can be executed even without activating the display unit, the user can quickly execute a function without a procedure for activating the display unit.

Also, the mobile terminal according to an embodiment of the present invention can provide various functions to a user through simple manipulation. In addition, since there is no need to activate the display unit to execute various functions not requiring activation of the display unit, power consumption can be reduced.

Also, in the mobile terminal according to an embodiment of the present invention, the touch sensor for sensing a touch when the display unit is deactivated is periodically activated or deactivated. In this instance, when a first tap applied to the deactivated display unit is sensed, the touch sensor is fully activated in order to sense a second tap to be applied thereafter, a tap pattern can be accurately calculated and power consumption due to the sensing unit can be reduced.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit configured to provide wireless communication;
a display unit;
a sensing unit configured to sense a plurality of taps applied to the display unit; and
a controller configured to:
control the display unit to be in a deactivated state,
receive a plurality of taps applied to the display unit in the deactivated state,
execute a voice recognition function while maintaining the display unit in the deactivated state, when a pattern formed by the plurality of taps matches a preset pattern,
receive a voice input together with the plurality of taps, and
execute a function corresponding to the received voice input based on a finally applied tap among the plurality of taps being maintained,
wherein the voice input is received before the finally applied tap.

2. The mobile terminal of claim 1, wherein the controller is further configured to execute the voice recognition function when the finally applied tap among the plurality of taps is maintained.

3. The mobile terminal of claim 2, wherein the controller is further configured to terminate the voice recognition function when the finally applied tap is released.

4. The mobile terminal of claim 3, wherein the controller is further configured to terminate the voice recognition function when the finally applied tap is no longer sensed and a preset period of time has lapsed.

5. The mobile terminal of claim 2, wherein the controller is further configured to:
receive a voice input while the voice recognition function is executed, and
activate at least a portion of the display unit and display screen information of a corresponding function designated by the voice input.

6. The mobile terminal of claim 5, wherein when the corresponding function corresponds to one function, the controller displays the screen information for the corresponding one function, and when the corresponding function corresponds to at least two functions, the controller displays graphic objects respectively corresponding to the at least two functions on the display unit.

7. The mobile terminal of claim 1, wherein the controller is further configured to output notification information indicating the execution of the voice recognition function including at least any one among a visual method, an acoustic method, and a tactile method.

8. The mobile terminal of claim 2, wherein the controller is further configured to output notification information indicating the voice recognition is available when the finally applied tap is released and a voice input is not received.

9. The mobile terminal of claim 1, wherein the controller is further configured to receive a user selection as to whether the function corresponding to the received voice input is to be executed.

10. The mobile terminal of claim 9, wherein when the pattern formed by the plurality of taps is not identical to the pre-set pattern, the controller is further configured not to execute the function corresponding to the received voice input.

11. The mobile terminal of claim 1, further comprising:
at least first and second speakers having different output sound paths,
wherein the controller is further configured to:
output a sound related to the voice recognition function using the first speaker when a user is a first predetermined distance from the mobile terminal, and
output the sound related to the voice recognition function using the second speaker when the user is a second predetermined distance from the mobile terminal greater than the first predetermined distance.

12. The mobile terminal of claim 11, wherein an output amplitude of the sound output from the first speaker is smaller than that of the second speaker.

13. A method of controlling a mobile terminal, the method comprising:
controlling, via a controller of the mobile terminal, a display unit to be in a deactivated state;

receiving a plurality of taps applied to the display unit in the deactivated state;

executing, via the controller, a voice recognition function while maintaining the display unit in the deactivated state, when a pattern formed by the plurality of taps matches a preset pattern;

receiving a voice input together with the plurality of taps; and executing a function corresponding to the received voice input based on a finally applied tap among the plurality of taps being maintained, wherein the voice input is received before the finally applied tap.

14. The method of claim 13, further comprising:
executing the voice recognition function when the finally applied tap among the plurality of taps is maintained.

15. The method of claim 14, further comprising:
terminating the voice recognition function when the finally applied tap is released.

16. The method of claim 15, further comprising:
terminating the voice recognition function when the finally applied tap is no longer sensed and a preset period of time has lapsed.

17. The method of claim 14, further comprising:
receiving a voice input while the voice recognition function is executed; and activating at least a portion of the display unit and display screen information of a corresponding function designated by the voice input.

18. The method of claim 17, wherein when the corresponding function corresponds to one function, the method further comprises displaying the screen information for the corresponding one function, and when the corresponding function corresponds to at least two functions, the method further comprises displaying graphic objects respectively corresponding to the at least two functions on the display unit.

* * * * *